US012679947B1

(12) United States Patent
Kamble et al.

(10) Patent No.: US 12,679,947 B1
(45) Date of Patent: Jul. 14, 2026

(54) PROCESS FOR THE RECOVERY OF POLYMERS FROM MIXED PLASTIC WASTE

(71) Applicant: MANGALORE REFINERY & PETROCHEMICALS LTD., Mangalore (IN)

(72) Inventors: Sanjay Pandurang Kamble, Pune (IN); Karthick Ramalingam, Mangalore (IN); Nishant Nandkishore Markandeya, Pune (IN); Manjunatha Megur Ganesh Bhat, Mangalore (IN); Pramod Kumar Hegde, Mangalore (IN); Narendra Bodawar, Pune (IN); Jatin Yadav, Mangalore (IN); Sunil Sitaram Bhongale, Pune (IN); Sathyanarayana Hanakere Channaiah, Mangalore (IN)

(73) Assignee: MANGALORE REFINERY & PETROCHEMICAL LTD., Mangalore (IN)

( * ) Notice: Subject to any disclaimer, the term of this patent is extended or adjusted under 35 U.S.C. 154(b) by 0 days.

(21) Appl. No.: 19/331,147

(22) Filed: Sep. 17, 2025

(51) Int. Cl.
C08J 11/08 (2006.01)
(52) U.S. Cl.
CPC ............ C08J 11/08 (2013.01); *C08J 2325/06* (2013.01); *C08J 2327/06* (2013.01); *C08J 2367/03* (2013.01); *C08J 2369/00* (2013.01)

(58) Field of Classification Search
USPC ......................................................... 521/46.5
See application file for complete search history.

(56) References Cited

U.S. PATENT DOCUMENTS

| 5,198,471 | A | * | 3/1993 | Nauman | .................. | C08J 11/08 |
| | | | | | | 521/46.5 |
| 7,056,956 | B2 | * | 6/2006 | Vandenhende | .......... | C08J 11/08 |
| | | | | | | 521/49 |

FOREIGN PATENT DOCUMENTS

GB          2078138 A  *  1/1982  ............. B03B 9/061

* cited by examiner

*Primary Examiner* — Terressa Boykin
(74) *Attorney, Agent, or Firm* — The Roy Gross Law Firm, LLC; Roy D. Gross

(57) ABSTRACT

The present disclosure relates to a process for the recovery of polymers from plastic waste. The process of the present disclosure is simple and environmentally friendly. The process of the present disclosure recovers various polymers such as low-density polyethylene (LDPE), high-density polyethylene (HDPE), polyethylene (PE), polypropylene (PP), polystyrene (PS), polyvinyl chloride (PVC), polycarbonate (PC), polyethylene terephthalate (PET), nylon, and ethylene vinyl alcohol (EVOH).

10 Claims, 14 Drawing Sheets

PROCESS FOR THE RECOVERY OF POLYMERS FROM MIXED PLASTIC WASTE

FIELD

Figure 1:
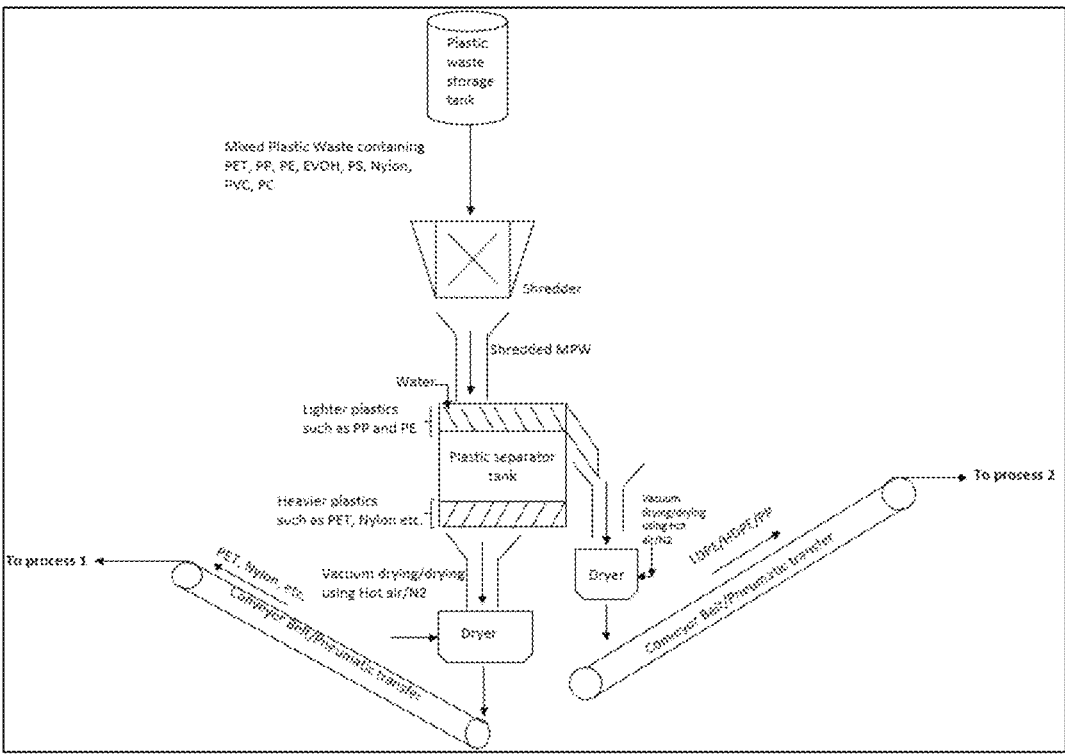

The present disclosure relates to the recovery of polymers. Particularly, the present disclosure relates to a process for the recovery of multiple polymers from mixed plastic waste.

Definitions

As used in the present disclosure, the following terms are generally intended to have the meaning as set forth below, except to the extent that the context in which they are used to indicate otherwise.

Mixed plastic waste: The term "mixed plastic waste" refers to plastic waste containing different types of plastics such as low-density polyethylene (LDPE), high-density polyethylene (HDPE), polyethylene (PE), polypropylene (PP), polystyrene (PS), polyvinyl chloride (PVC), polycarbonate (PC), polyethylene terephthalate (PET), nylon, ethylene vinyl alcohol (EVOH) and the like.

Light plastic: The term "light plastic" refers to plastics having a density less than 1.0 g/cm$^3$ and includes plastics such as polypropylene (PP), high-density polyethylene (HDPE), low-density polyethylene (LDPE) and the like.

Heavy plastic: The term "heavy plastic" refers to plastics having a density higher than 1.0 g/cm$^3$ and includes plastics such as polystyrene (PS), polyvinyl chloride (PVC), polycarbonate (PC), polyethylene terephthalate (PET), nylon, ethylene vinyl alcohol (EVOH) and the like

BACKGROUND

The background information herein below relates to the present disclosure but is not necessarily prior art.

Plastics are widely used in various sectors such as textiles, electronics, electrical, medical, fast moving consumer goods (FMCG), household products, automotive, transportation and the like for the production of articles such as bottles, packaging, trays, cans, bags and the like. Due to the excessive use of the plastics and its non-biodegradability, it has become a significant part of the solid, eco-unfriendly garbage. The majority of plastic waste from industrial or post-consumer use end up in landfills, exacerbating already existing severe environmental issues such as air, water, land pollution and the like. Therefore, plastic recycling is very important, both industrially and environmentally.

Additionally, manufacturers bear an additional burden due to the costs associated with disposing of post-industrial plastic waste.

In conventional methods, plastic waste is recycled by using processing steps such as shredding, sieving, separating, extruding and the like. These conventional flow of recycling of plastic waste results in lower quality of recycled materials than virgin materials. Further, the recycled materials contain impurities which lead to poor quality of recycled/recovered end products. Although conventionally separated, cleaned, recycled material can be used to create new plastic based products, the inclusion of such recycled materials limits the use of resulting plastic articles due to their quality.

Therefore, there is felt a need to provide a process for the recovery of polymers from plastic waste that mitigates the aforestated drawbacks or at least provides a useful alternative.

OBJECTS

Some of the objects of the present disclosure, which at least one embodiment herein satisfies, are as follows:

It is an object of the present disclosure to ameliorate one or more problems of the background or to at least provide a useful alternative.

An object of the present disclosure is to provide a process for the recovery of polymers from mixed plastic waste.

Another object of the present disclosure is to provide a process for the recovery of polymers from multi-component plastic waste.

Still another object of the present disclosure is to provide a process for the recovery of polymers by using selective solubilization which can be depolymerized to obtain monomers.

Yet another object of the present disclosure is to provide a process for the recovery of polymers from plastic waste that is simple and cost-efficient.

Still another object of the present disclosure is to provide a process for the recovery of polymers from mixed plastic waste that is scalable and energy saving.

Yet another object of the present disclosure is to provide a process for the recovery of polymers from mixed plastic waste that is environment friendly.

Other objects and advantages of the present disclosure will be more apparent from the following description, which is not intended to limit the scope of the present disclosure.

SUMMARY

The present disclosure relates to a process for the recovery of polymers from mixed plastic waste comprises the following steps:

a) shredding mixed plastic waste to a predetermined particle size followed by mixing with water and separating a floating top layer of light material containing light plastic and a settled bottom layer of heavy material containing heavy plastic;

b) separately drying the light material containing light plastic and the heavy material containing heavy plastic in a dryer to obtain a dried light plastic and a dried heavy plastic;

c) sequentially separating polymers selected from polystyrene (PS), polyvinyl chloride (PVC), ethyl vinyl alcohol (EVOH), nylon, polycarbonate (PC) and polyethylene terephthalate (PET) from the dried heavy plastic by;

I. mixing the dried heavy plastic in a first fluid medium capable of solubilizing polystyrene under stirring at a first predetermined temperature to obtain a first crude mixture followed by separating the first crude mixture to obtain a first filtrate and first solids containing undissolved plastic material; and subjecting the first filtrate to a predetermined method to obtain polystyrene and the first fluid medium;

II. mixing the first solids in a second fluid medium capable of solubilizing polyvinyl chloride under stirring at a second predetermined temperature to obtain a second crude mixture followed by separating the second crude mixture to obtain a second filtrate and second solids containing undissolved plastic material; and subjecting the second filtrate to a predetermined method to obtain polyvinyl chloride and the second fluid medium;

III. mixing the second solids in a third fluid medium capable of solubilizing ethyl vinyl alcohol (EVOH)

under stirring at a third predetermined temperature to obtain a third crude mixture followed by separating the third crude mixture to obtain a third filtrate and third solids containing undissolved plastic material; and subjecting the third filtrate to a predetermined method to obtain ethyl vinyl alcohol (EVOH) and the third fluid medium;

IV. mixing the third solids in a fourth fluid medium capable of solubilizing nylon under stirring at a fourth predetermined temperature to obtain a fourth crude mixture followed by separating the fourth crude mixture to obtain a fourth filtrate and fourth solids containing undissolved plastic material; and subjecting the fourth filtrate to a predetermined method to obtain nylon and the fourth fluid medium;

V. mixing the fourth solids in a fifth fluid medium capable of solubilizing polycarbonate (PC) under stirring at a fifth predetermined temperature to obtain a fifth crude mixture followed by separating the fifth crude mixture to obtain a fifth filtrate and fifth solids containing undissolved plastic material; and subjecting the fifth filtrate to a predetermined method to obtain polycarbonate (PC) and the fifth fluid medium; and VI. mixing the fifth solids in a sixth fluid medium capable of solubilizing polyethylene terephthalate (PET) under stirring at a sixth predetermined temperature to obtain a sixth crude mixture followed by separating the seventh crude mixture to obtain a sixth filtrate and sixth solids containing residual plastic material; and subjecting the sixth filtrate to a predetermined method to obtain polyethylene terephthalate (PET) and the sixth fluid medium; and d) sequentially separating polymers selected from polypropylene (PP), high density polyethylene (HDPE), low density polyethylene (LDPE) from the dried light plastic by solubilizing the dried light plastic in a seventh fluid medium under stirring at a seventh predetermined temperature to obtain a seventh crude mixture followed by I. cooling the seventh crude mixture to a temperature in the range of 110° C. to 120° C. followed by filtering to obtain polypropylene and a seventh filtrate;

II. cooling the seventh filtrate to a temperature in the range of 90° C. to 100° C. followed by filtering to obtain high density polyethylene and an eighth filtrate; and III. cooling the eighth filtrate to a temperature in the range of 75° C. to 85° C. followed by filtering to obtain low density polyethylene and the seventh fluid medium.

Polypropylene, high density polyethylene, low density polyethylene, polystyrene (PS), polyvinyl chloride (PVC), ethyl vinyl alcohol (EVOH), nylon, polycarbonate (PC) and polyethylene terephthalate (PET) are independently dried.

The first crude mixture, the second crude mixture, the third crude mixture, the fourth crude mixture, the fifth crude mixture, the sixth crude mixture and the seventh crude mixture are independently passed in an activated carbon bed to remove color impurities.

The first fluid medium, the second fluid medium, the third fluid medium, the fourth fluid medium, the fifth fluid medium and the sixth fluid medium are independently recycled for solubilizing the dried heavy plastic, the first solids, the second solids, the third solids, the fourth solids and the fifth solids, respectively.

The seventh fluid medium is recycled to step d) for solubilizing the dried light plastic.

The predetermined method is selected from the group consisting of cooling, adding an antisolvent, distillation, centrifugation, skimming, and settling and filtration.

The cooling is carried out at a temperature in the range of 25° C. to 30° C.

The predetermined particle size is in the range of 0.1 mm to 10 mm; the first predetermined temperature is in the range of 30° C. to 50° C.; the second predetermined temperature is in the range of 40° C. to 60° C.; the third predetermined temperature is in the range of 60° C. to 80° C.; the fourth predetermined temperature is in the range of 90° C. to 110° C.; the fifth predetermined temperature is in the range of 110° C. to 130° C.; and the sixth predetermined temperature is in the range of 140° C. to 160° C.; and the seventh predetermined temperature is in the range of 110° C. to 130° C.

The first fluid medium is selected from the group consisting of ethyl methyl ketone (EMK), tetrahydrofuran (THF), toluene, xylene, N-methyl-2-pyrrolidone (NMP), valeronitrile, trichloroacetic acid, 1-naphthol, 1,2-dihydroxybenzene (catechol), dimethyl formamide (DMF), N,N-dimethyl acetamide, cyclohexanone, N-Methyl-2-pyrrolidone (NMP), cyclopentanone, and mesityl oxide; the second fluid medium is selected from the group consisting of tetrahydrofuran (THF), toluene, 2,3-dihydropyran, pyridine, chlorobenzene, ethyl acetoacetate, diethyleneglycol, propylene carbonate, 1-butanol, dimethyl formamide (DMF), N,N-dimethyl acetamide, cyclohexanone, morpholine, N-Methyl-2-pyrrolidone (NMP), valeronitrile, cyclopentanone, and dimethyl sulfoxide (DMSO); the third fluid medium is at least one selected from the group consisting of isopropyl alcohol (IPA), water, dimethyl sulfoxide (DMSO), propanediol (PDO), pyridine, diethyleneglycol, hydrogen peroxide, chloro acetic acid, dimethyl formamide (DMF), acrylic acid, N,N-dimethyl acetamide, phenol, cyclohexylamine, ethyl amine, morpholine, and N-methyl-2-pyrrolidone (NMP); the fourth fluid medium is selected from the group consisting of formic acid, propanediol (PDO), dimethyl sulfoxide (DMSO), hydrogen peroxide, acetic acid, formic acid, chloro acetic acid, acrylic acid, benzoic acid, propionic acid, butyric acid, methacrylic acid, and isobutyric acid; the fifth fluid medium is selected from the group consisting of dimethyl sulfoxide (DMSO), ethyl methyl ketone (EMK), toluene, 2,3-dihydropyran, pyridine, and butanone; and the sixth fluid medium is selected from the group consisting of dimethyl formamide (DMF), gamma-valerolactone (GVL), dimethyl formamide, dimethyl sulfoxide (DMSO), pyridine, N,N-dimethyl acetamide, phenol, N-Methyl-2-pyrrolidone (NMP), valeronitrile, trichloroacetic acid, 1-Naphthol, and 1,2-dihydroxybenzene (catechol); and the seventh fluid medium is selected from the group consisting of o-xylene, p-xylene, mixed xylene, toluene, dodecane, camphene, 1-butanol, tetrahydrofuran (THF), 1-octene, ethyl benzene and di-n-butyl ether.

The antisolvent is selected from the group consisting of water, hexane, acetone, isopropyl alcohol (IPA), methanol and ethanol.

In an embodiment, step (c) comprises parallel and simultaneous separation of polymers selected from polystyrene (PS), polyvinyl chloride (PVC), ethyl vinyl alcohol (EVOH), nylon, polycarbonate (PC) and polyethylene terephthalate (PET) from the dried heavy plastic.

BRIEF DESCRIPTION OF THE ACCOMPANYING DRAWING

Figure 2A:
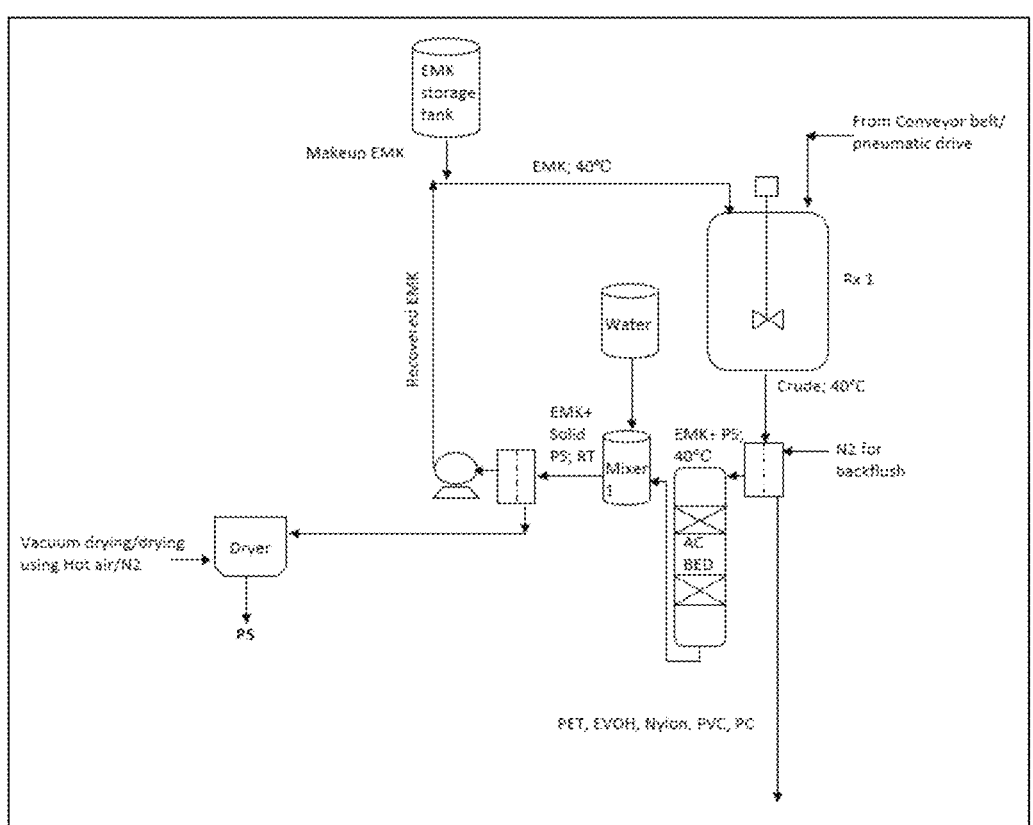
Figure 2B:
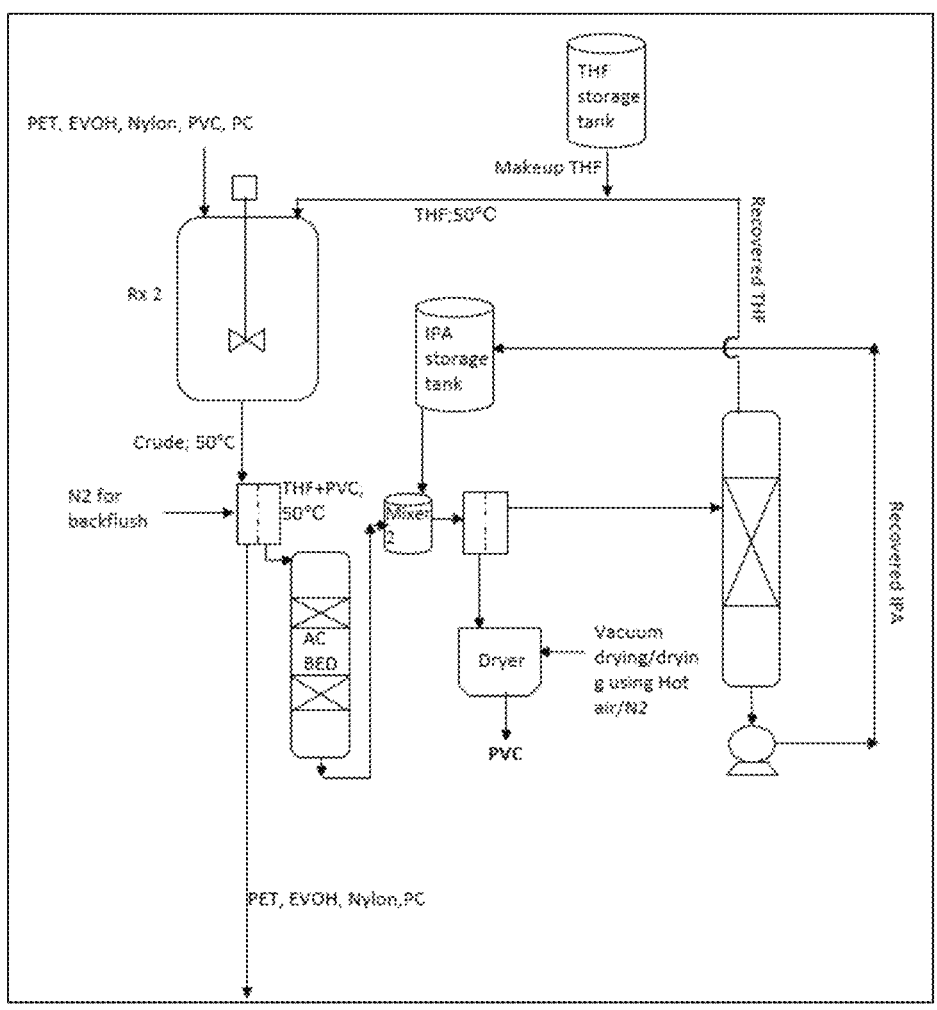
Figure 2C:
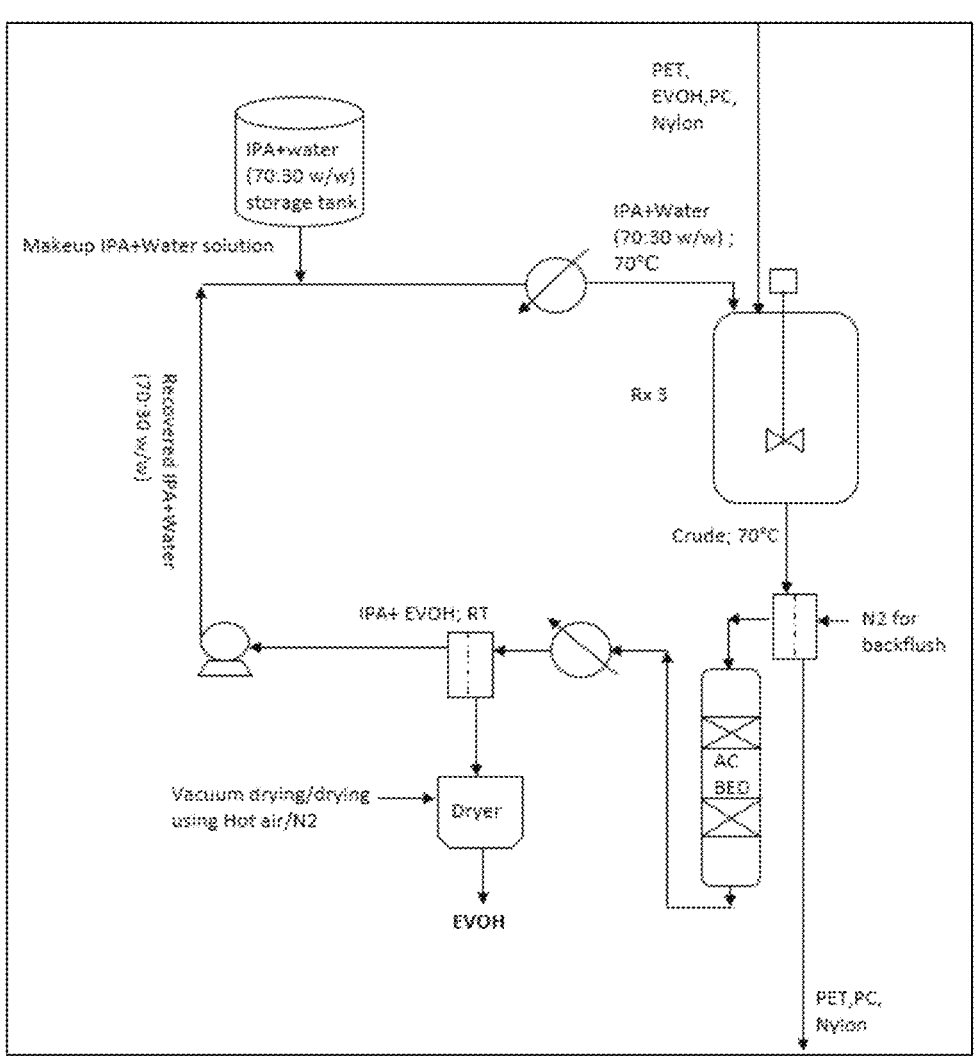
Figure 2D:
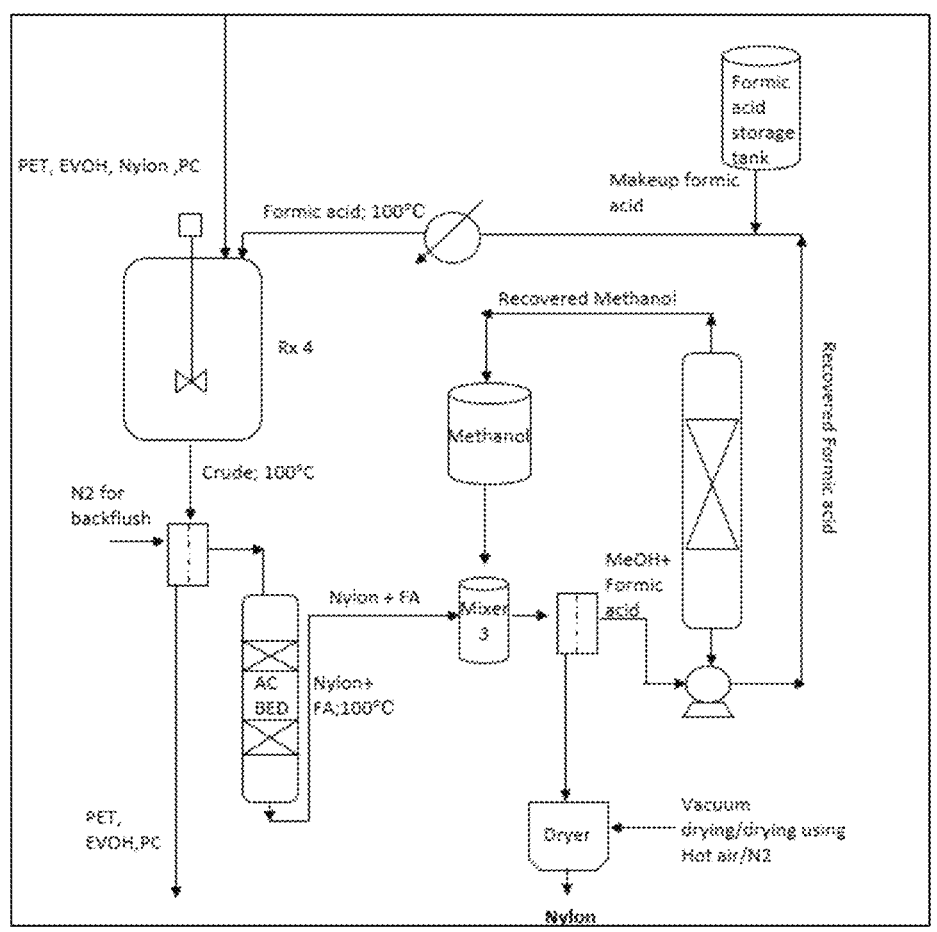
Figure 2E:
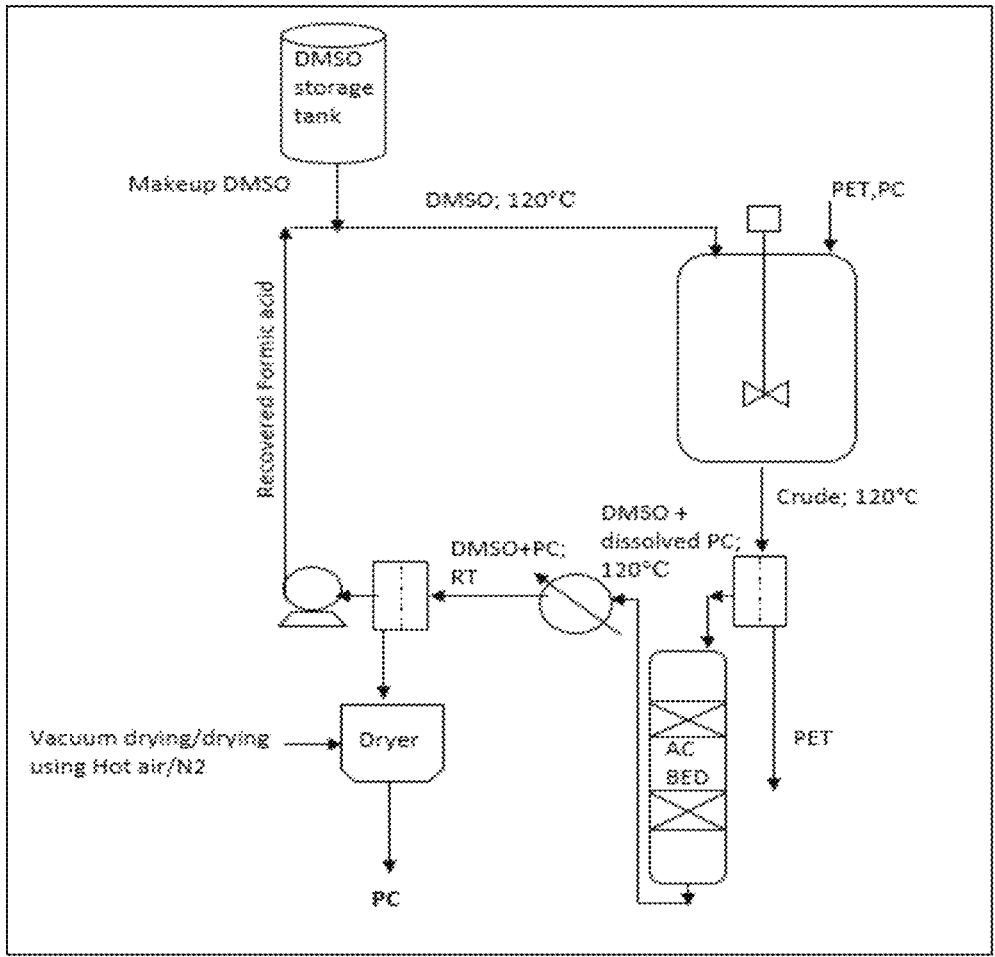
Figure 2F:
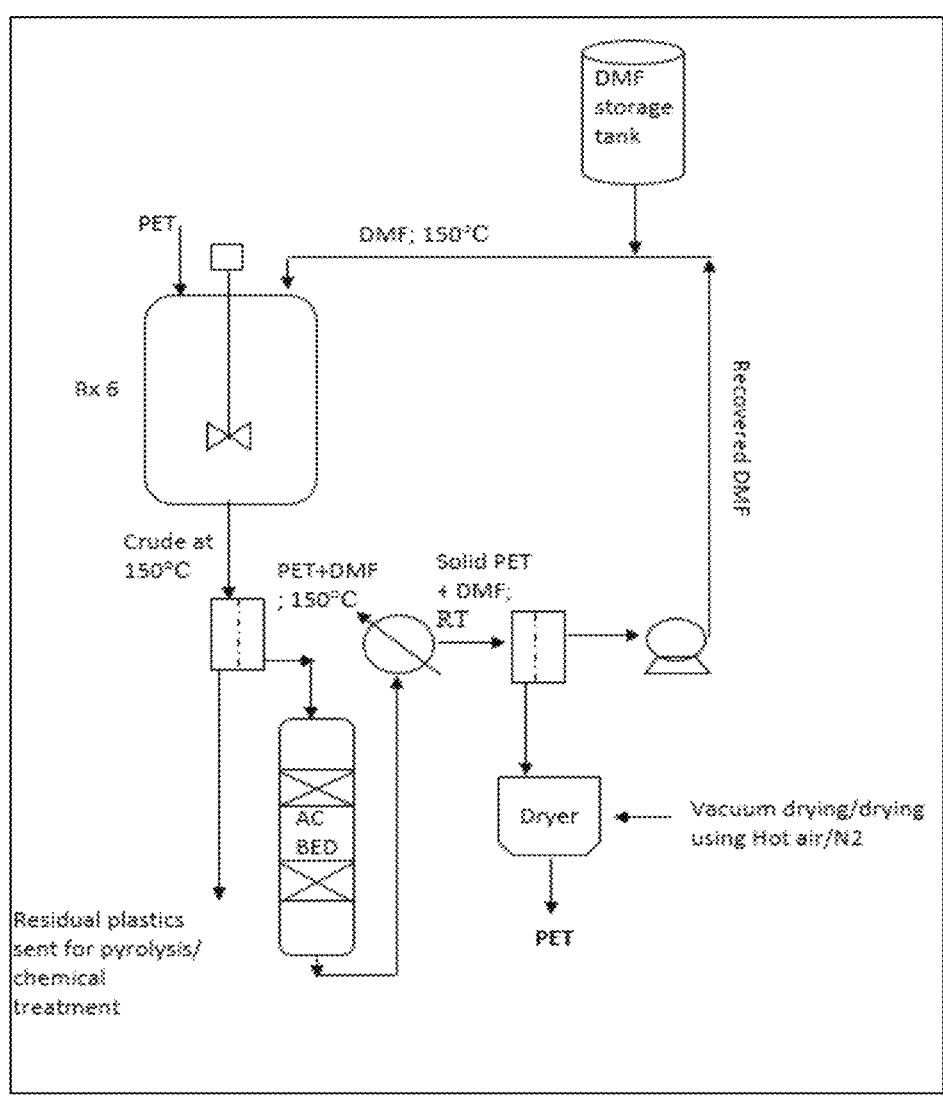
Figure 3:
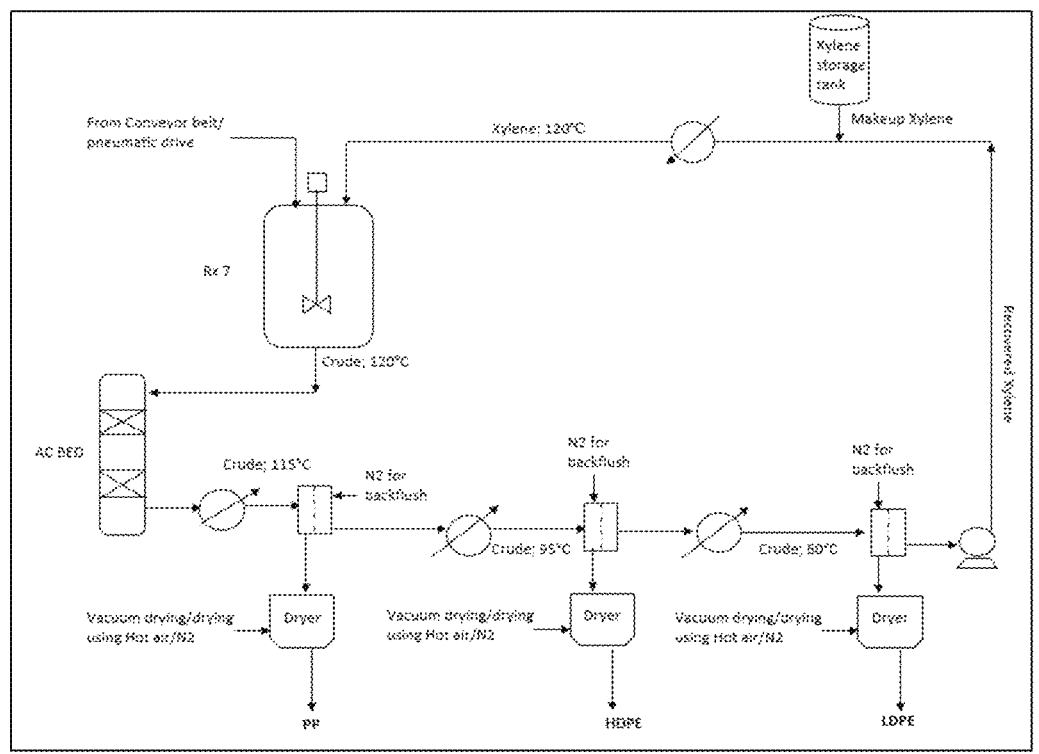
Figure 4A:
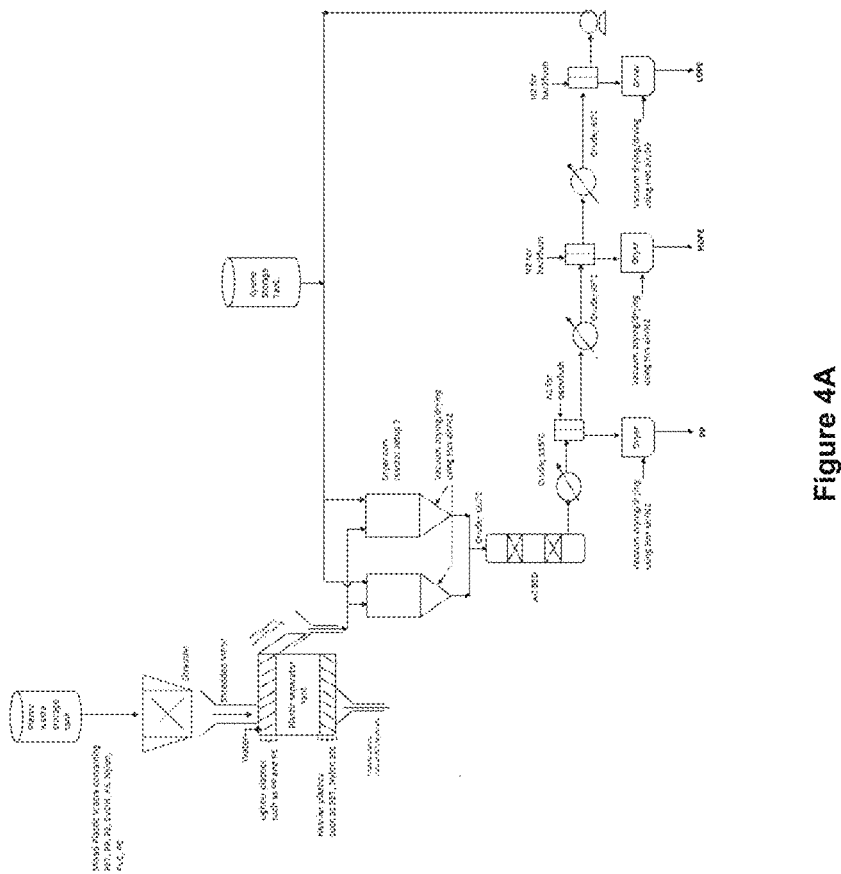
Figure 4B:
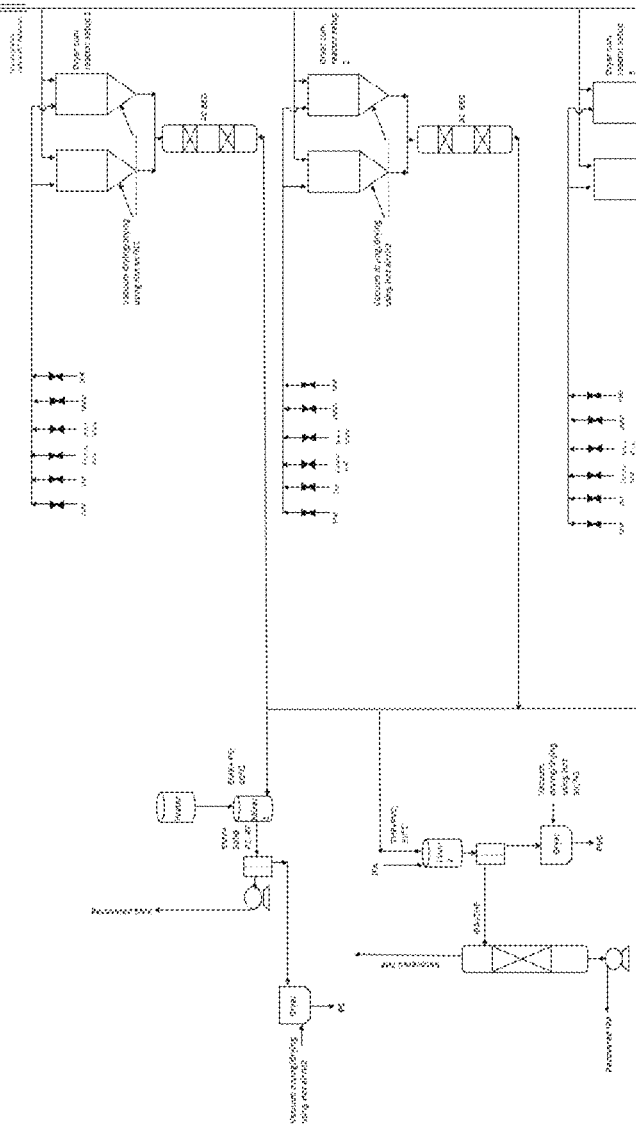
Figure 4C:
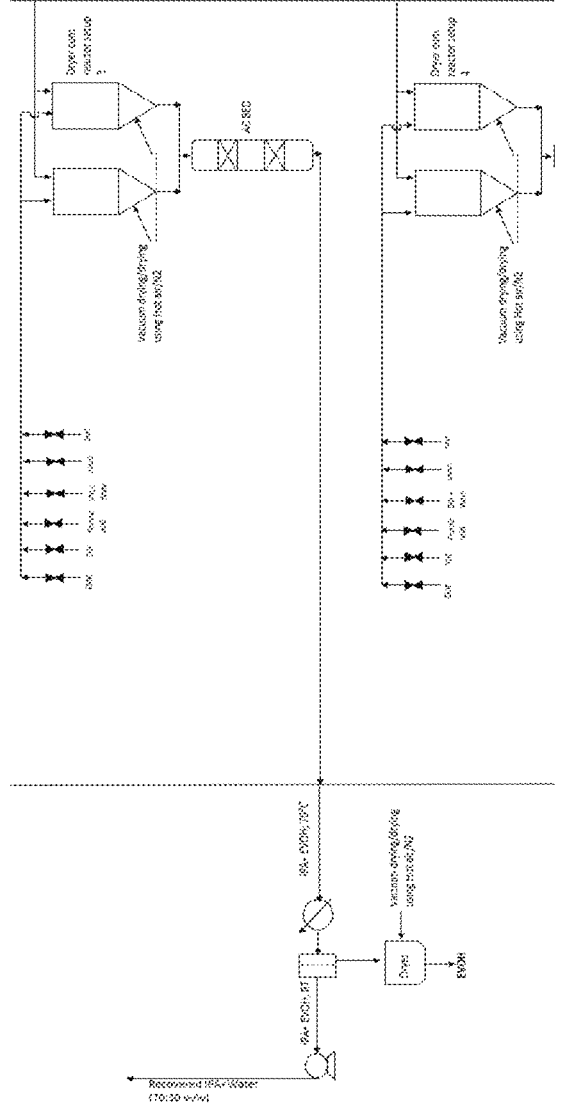
Figure 4D:
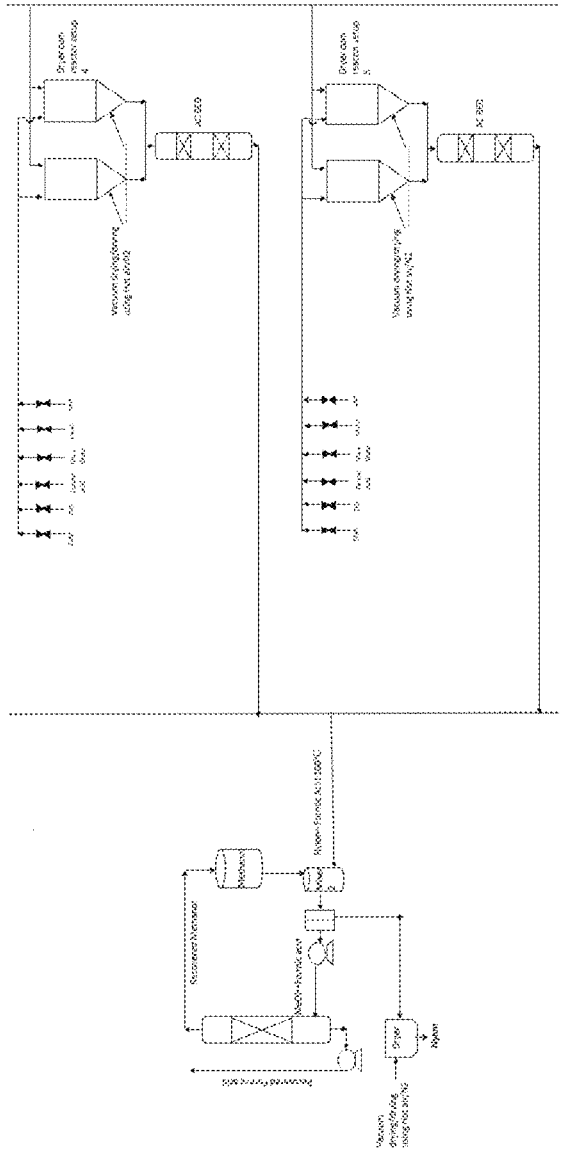
Figure 4E:
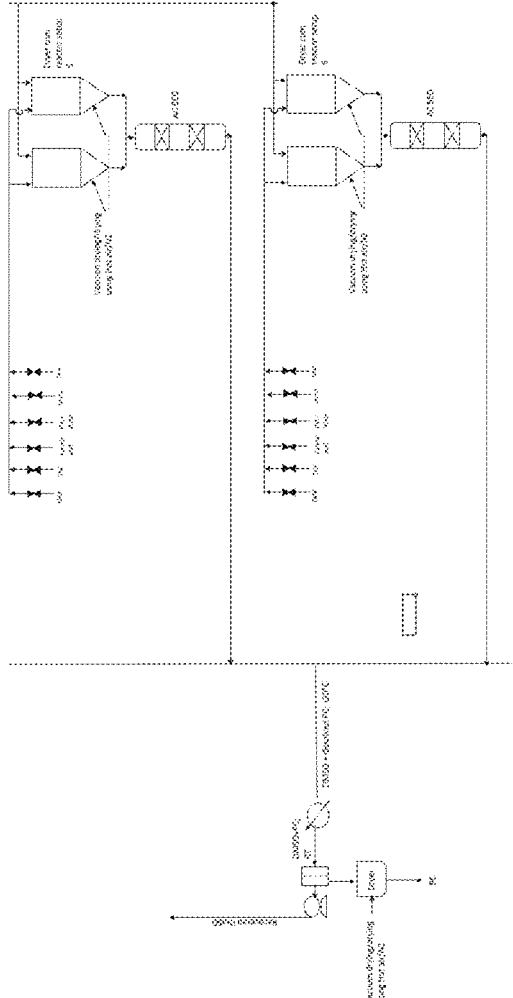
Figure 4F:
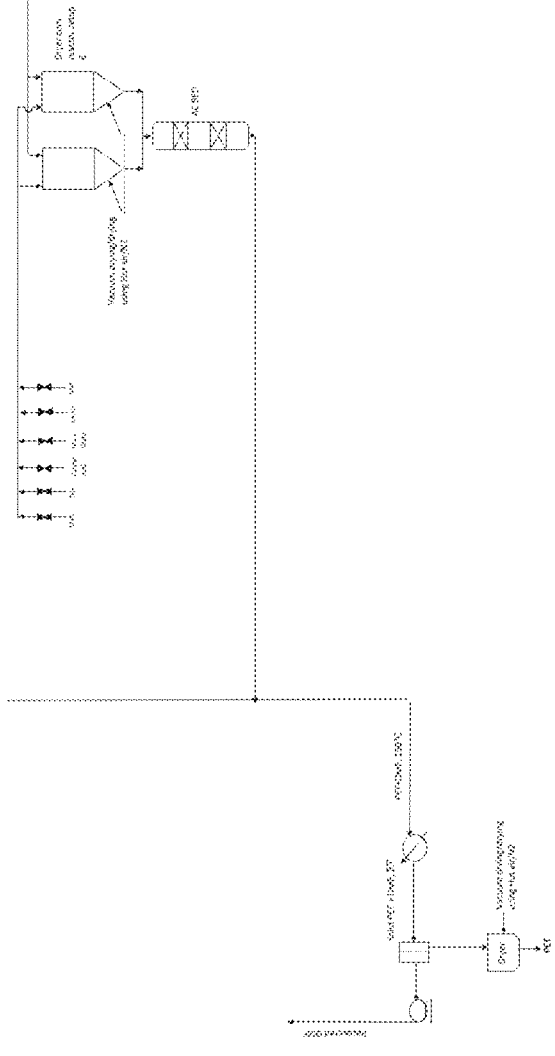

The present disclosure will now be described with the help of the accompanying drawing, in which:

FIG. 1 illustrates a schematic representation for the physical separation of mixed plastic waste, wherein heavy and light plastics are separated in accordance with the present disclosure;

FIG. 2A-2F illustrate a schematic representation of the process for the recovery of polymers from separated heavy plastic, wherein FIG. 2(A) represents selective solubilization and recovery of polystyrene (PS), FIG. 2(B) represents selective solubilization and recovery of polyvinyl chloride (PVC), FIG. 2(C) represents selective solubilization and recovery of ethyl vinyl alcohol (EVOH), FIG. 2(D) represents selective solubilization and recovery of Nylon, FIG. 2(E) represents selective solubilization and recovery of polycarbonate (PC) and FIG. 2(F) represents selective solubilization and recovery of polyethylene terephthalate (PET) in accordance with the present disclosure;

FIG. 3 illustrates a schematic representation of the process for the recovery of polymers from separated light plastic waste, wherein polypropylene (PP), high density polyethylene (HDPE) and light density polyethylene (LDPE) are separated and recovered in accordance with the present disclosure; and FIG. 4(A) illustrates a schematic representation of alternative process for the process for the recovery of polymers, wherein separated heavy plastic are taken from bottom of the water separation tank and sent to set of 12 dryer cum reactor system in equal proportions with pair of two in series and separated lighter plastic waste, wherein FIG. 4(B) represents selective solubilization and recovery of polystyrene (PS) and polyvinyl chloride (PVC), FIG. 4(C) represents selective solubilization and recovery of ethyl vinyl alcohol (EVOH), FIG. 4(D) represents selective solubilization and recovery of Nylon, FIG. 4(E) represents selective solubilization and recovery of polycarbonate (PC) and FIG. 4(F) represents selective solubilization and recovery of polyethylene terephthalate (PET) in accordance with the present disclosure.

DETAILED DESCRIPTION

The present disclosure relates to the recovery of polymers. Particularly, the present disclosure relates to a process for the recovery of multiple polymers from mixed plastic waste.

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer, or section. Terms such as first, second, third etc., when used herein do not imply a specific sequence or order unless clearly suggested by the present disclosure.

Plastics are widely used in various sectors such as textiles, electronics, electrical, medical, fast moving consumer goods (FMCG), household products, automotive, transportation and the like for the production of articles such as bottles, packaging, trays, cans, bags and the like. Due to the excessive use of the plastics and its non-biodegradability, it is now a significant part of the solid, eco-unfriendly garbage. The majority of waste plastic from industrial or post-consumer use end up in landfills, exacerbating already existing severe environmental issues such as air, water, land pollution and the like. Therefore, plastic recycling is very important, both industrially and environmentally. Additionally, manufacturers bear an additional burden due to the costs associated with disposing of post-industrial plastic waste.

In conventional method, plastic waste is recycled by using processing steps such as shredding, sieving, separating, extruding and the like. These conventional flow of recycling of plastic waste results in lower quality of recycled materials than virgin materials. Further, the recycled materials contain impurities which lead to poor quality of recycled end products. Although conventionally separated, cleaned, recycled material can be used to create new plastic based products, the inclusion of such recycled materials limits the use of resulting plastic articles due to their quality.

The present disclosure provides a process for the recovery of polymers from mixed plastic waste. The process comprises the following steps:

a) shredding mixed plastic waste to a predetermined particle size followed by mixing with water and separating a floating top layer of light material containing light plastic and a settled bottom layer of heavy material containing heavy plastic;

b) separately drying the light material containing light plastic and the heavy material containing heavy plastic in a dryer to obtain a dried light plastic and a dried heavier plastic;

c) sequentially separating polymers selected from polystyrene (PS), polyvinyl chloride (PVC), ethyl vinyl alcohol (EVOH), nylon, polycarbonate (PC) and polyethylene terephthalate (PET) from the dried heavy plastic by:

I. mixing the dried heavy plastic in a first fluid medium capable of solubilizing polystyrene under stirring at a first predetermined temperature to obtain a first crude mixture followed by separating the first crude mixture to obtain a first filtrate and first solids containing undissolved plastic material; and subjecting the first filtrate to a predetermined method to obtain polystyrene and the first fluid medium;

II. mixing the first solids in a second fluid medium capable of solubilizing polyvinyl chloride under stirring at a second predetermined temperature to obtain a second crude mixture followed by separating the second crude mixture to obtain a second filtrate and second solids containing undissolved plastic material; and subjecting the second filtrate to a predetermined method to obtain polyvinyl chloride and the second fluid medium;

III. mixing the second solids in a third fluid medium capable of solubilizing ethyl vinyl alcohol (EVOH) under stirring at a third predetermined temperature to obtain a third crude mixture followed by separating the third crude mixture to obtain a third filtrate and third solids containing undissolved plastic material; and subjecting the third filtrate to a predetermined method to obtain ethyl vinyl alcohol (EVOH) and the third fluid medium;

IV. mixing the third solids in a fourth fluid medium capable of solubilizing nylon under stirring at a fourth predetermined temperature to obtain a fourth crude mixture followed by separating the fourth crude mixture to obtain a fourth filtrate and fourth solids containing undissolved plastic material; and subjecting the fourth filtrate to a predetermined method to obtain nylon and the fourth fluid medium;

V. mixing the fourth solids in a fifth fluid medium capable of solubilizing polycarbonate (PC) under stirring at a fifth predetermined temperature to obtain a fifth crude mixture followed by separating the fifth crude mixture to obtain a fifth filtrate and fifth solids containing undissolved plastic material; and subjecting the fifth filtrate to a predetermined method to obtain polycarbonate (PC) and the fifth fluid medium; and VI. mixing the fifth solids in a sixth fluid medium capable of solubilizing polyethylene terephthalate (PET) under stirring at a sixth predetermined temperature to obtain a sixth crude mixture followed by separating the sixth crude mixture to obtain a sixth filtrate and sixth solids containing residual plastic material; and subjecting the sixth filtrate to a predetermined method to obtain polyethylene terephthalate (PET) and the sixth fluid medium; and d) sequentially separating polymers selected from polypropylene (PP), high density polyethylene (HDPE), low density polyethylene (LDPE) from the dried light plastic by solubilizing the dried light plastic in a seventh fluid medium under stirring at a seventh predetermined temperature to obtain a seventh crude mixture followed by:

I. cooling the seventh crude mixture to a temperature in the range of 110° C. to 120° C. followed by filtering to obtain polypropylene and a seventh filtrate;

II. cooling the seventh filtrate to a temperature in the range of 90° C. to 100° C. followed by filtering to obtain high density polyethylene and an eighth filtrate; and III. cooling the eighth filtrate to a temperature in the range of 75° C. to 85° C. followed by filtering to obtain low density polyethylene and the seventh fluid medium.

The process is described in detail.

In a first step, mixed plastic waste is shredded to a predetermined particle size followed by mixing with water and separating a floating top layer of light material containing light plastic and a settled bottom layer of heavy material containing heavy plastic.

FIG. 1 illustrates a schematic representation for the physical separation of mixed plastic waste wherein heavy and light plastics are separated in accordance with the present disclosure.

In an embodiment of the present disclosure, a mixed plastic waste is a stream containing PET, PP, PE, EVOH, PS, Nylon, PC and PVC that is transferred to a shredder so as to reduce its size for better solubilization and separation efficiency.

In an embodiment of the present disclosure, the predetermined particle size of the shredded plastic waste is in the range of 0.1 mm to 10 mm. In an exemplary embodiment of the present disclosure, the particle size of the shredded plastic waste is in the range of 1 mm to 10 mm.

The shredded plastics are subjected to water separation step, wherein the shredded plastic waste is mixed with water. This helps in separation of plastics based on the density. Light plastics such as polypropylene (PP) and polyethylene (PE) float on the water forming a top layer of light material containing light plastic, whereas the heavy plastics sink/settle at the bottom forming a bottom layer of heavy material containing heavy plastic. Other suitable solvents such as 10% aqueous acetic acid or 10% aqueous NaOH solution of known density (~1 $g/cm^3$) can also be used for removing dirt from the plastics.

In a second step, the light material containing light plastic and the heavy material containing heavy plastic are separately dried in a dryer to obtain a dried light plastic and a dried heavy plastic.

In an embodiment of the present disclosure, the two separate layers (the top layer of the light plastic and the bottom layer of the heavy plastic) are formed after sufficient residence time in water.

In an embodiment of the present disclosure, the top layer consisting of light material containing light plastic is taken out from the top and is sent to a vacuum dryer for drying to obtain a dried light plastic. The dried light plastic is transferred through a conveyor belt for further process.

In an embodiment of the present disclosure, the light plastic comprise the polymers selected from the group consisting of polypropylene (PP), high density polyethylene (HDPE) and low density polyethylene (LDPE).

In an embodiment of the present disclosure, the heavy material containing heavy plastic that sank at the bottom is also be taken out and sent to a separate vacuum dryer for drying to obtain a dried heavy plastic. The dried heavy plastic is transferred through a conveyor belt for further process.

In an embodiment of the present disclosure, the heavy plastic comprises the polymers selected from the group consisting of polystyrene (PS, polyvinyl chloride (PVC), ethyl vinyl alcohol (EVOH), nylon, polycarbonate (PC) and polyethylene terephthalate (PET).

The dried light plastic and the dried heavy plastic are transferred via routes selected from gravity flow conveying, pneumatic conveying, mechanical conveying such as screw conveyers, belt conveyors, and bucket conveyors for further recovery of individual polymers. In an exemplary embodiment of the present disclosure, the dried light plastic and the dried heavy plastic are transferred via conveyor belt or screw conveyor.

In an embodiment of the present disclosure, the dried light plastic and the dried heavy plastic are further sequentially separated into light polymers and heavy polymers, respectively.

In a third step, polymers selected from polystyrene (PS), polyvinyl chloride (PVC), ethyl vinyl alcohol (EVOH), nylon, polycarbonate (PC) and polyethylene terephthalate (PET) from the dried heavy plastic are sequentially separated.

The dried heavy plastic comprises polystyrene (PS), polyvinyl chloride (PVC), ethyl vinyl alcohol (EVOH), nylon, polycarbonate (PC) and polyethylene terephthalate (PET).

FIG. 2 illustrates a schematic representation of the process for the recovery of polymers from separated heavy plastic, wherein FIG. 2(A) represents selective solubilization and recovery of polystyrene (PS), FIG. 2(B) represents selective solubilization and recovery of polyvinyl chloride (PVC), FIG. 2(C) represents selective solubilization and recovery of ethyl vinyl alcohol (EVOH), FIG. 2(D) represents selective solubilization and recovery of Nylon, FIG. 2(E) represents selective solubilization and recovery of polycarbonate (PC) and FIG. 2(F) represents selective solubilization and recovery of polyethylene terephthalate (PET) in accordance with the present disclosure.

The dried heavy plastics/polymers are selectively solubilized and separated sequentially in the aforesaid order.

The sub-steps of the third step (separation of the heavy plastics/polymers) are described in detail.

Sub-step (I): the dried heavy plastic is mixed in a first fluid medium capable of solubilizing polystyrene under stirring at a first predetermined temperature to obtain a first crude mixture followed by separating the first crude mixture to obtain a first filtrate and first solids containing undissolved plastic material; and subjecting the first filtrate to a predetermined method obtain polystyrene (PS) and the first fluid medium.

In an embodiment of the present disclosure, the first fluid medium is selected from the group consisting of ethyl methyl ketone (EMK), tetrahydrofuran (THF), toluene, xylene, N-methyl-2-pyrrolidone (NMP), valeronitrile, trichloroacetic acid, 1-naphthol, 1,2-dihydroxybenzene (catechol), dimethyl formamide (DMF), N,N-dimethyl acetamide, cyclohexanone, N-methyl-2-pyrrolidone (NMP), cyclopentanone, and mesityl Oxide. In an exemplary embodiment of the present disclosure, the first fluid medium is ethyl methyl ketone (EMK).

In an embodiment of the present disclosure, the first predetermined temperature is in the range of 30° C. to 50° C. In an exemplary embodiment of the present disclosure, the first predetermined temperature is 40° C.

In an embodiment of the present disclosure, the predetermined method is selected from the group consisting of cooling, adding an antisolvent, distillation, centrifugation, skimming, and settling and filtration. In an exemplary embodiment of the present disclosure, the predetermined method is adding an antisolvent.

In an embodiment of the present disclosure, the antisolvent is selected from the group consisting of water, hexane, acetone, isopropyl alcohol (IPA), methanol, and ethanol. In an exemplary embodiment of the present disclosure, the antisolvent is water which is added in the first filtrate to precipitate polymer.

In an embodiment of the present disclosure, the first plastic/polymer separated from the dried heavy plastic is Polystyrene (PS), due to the lower solubilizing temperature of PS in Ethyl Methyl Ketone (EMK) at 40° C.

The dried heavy plastic is taken through the conveyor and sent to the first mixed tank reactor (Rx 1) (FIG. 2A). In this step, the dried heavy plastic is solubilized in EMK (a first fluid medium) under stirring at 40° C.

This step selectively dissolves PS.

In an embodiment of the present disclosure, the stirring is carried out at a stirring speed in the range of 200 rpm to 1000 rpm. In an exemplary embodiment of the present disclosure, the stirring speed is 400 rpm.

After a time period in the range of 2 hours to 3 hours of solubilizing time, the PS is dissolved in the EMK and remaining plastics/polymers remain in solid phase.

To remove the undissolved plastics, the first crude mixture (solution) is passed through the filter to obtain a first filtrate and first solids (containing undissolved plastic material). The first filtrate is passed through activated carbon bed to remove any colored dye present in the first filtrate. The first filtrate from the activated carbon bed is then sent to a mixer 1 where water is added as anti-solvent. This aids in removing the PS out from the first filtrate. The solution is filtered subsequently at a room temperature to remove the solid PS from first fluid medium (EMK). The fluid medium containing EMK and water is sent to distillation column for separating both EMK and water from it. After separation, both are recirculated back into the system. The solid PS is then passed through a dryer to get a final dry solid PS.

In an embodiment of the present disclosure, the drying of PS is carried out by using drying technique selected from vacuum drying, using hot air and using nitrogen.

To ensure complete recovery of PS in EMK, a predetermined number of reactors are used in series in co-current and counter-current mode of operation.

In an embodiment of the present disclosure, the predetermined number of reactors are in the range of 1 to 5 reactors. In an exemplary embodiment of the present disclosure, the predetermined number of reactor is 1.

In an embodiment of the present disclosure, nitrogen is used for pressure filtration.

The remaining plastics/polymers (first solids) are sent to a reactor Rx-2 (FIG. 2B) for further separation.

Sub-step (II): the first solids are mixed in a second fluid medium capable of solubilizing polyvinyl chloride under stirring at a second predetermined temperature to obtain a second crude mixture followed by separating the second crude mixture to obtain a second filtrate and second solids containing undissolved plastic material; and subjecting the second filtrate to a predetermined method to obtain polyvinyl chloride and the second fluid medium.

In an embodiment of the present disclosure, the second fluid medium is selected from the group consisting of THF, toluene, 2,3-dihydropyran, pyridine, chlorobenzene, ethyl acetoacetate, diethyleneglycol, propylene carbonate, 1-butanol, dimethyl formamide (DMF), N,N-dimethyl acetamide, cyclohexanone, morpholine, N-methyl-2-pyrrolidone (NMP), valeronitrile, cyclopentanone, and dimethyl sulfoxide (DMSO). In an exemplary embodiment of the present disclosure, the second fluid medium is THF.

In an embodiment of the present disclosure, the second predetermined temperature is in the range of 40° C. to 60° C. In an exemplary embodiment of the present disclosure, the second predetermined temperature is 50° C.

In an embodiment of the present disclosure, the predetermined method is selected from the group consisting of cooling, adding an antisolvent, distillation, centrifugation, skimming, and settling and filtration. In an exemplary embodiment of the present disclosure, the predetermined method is adding an antisolvent.

In an embodiment of the present disclosure, the antisolvent is selected from the group consisting of water, hexane, acetone, isopropyl alcohol (IPA), methanol, and ethanol. In an exemplary embodiment of the present disclosure, the antisolvent is isopropyl alcohol (IPA) which is added in the second filtrate to precipitate polymer.

In an embodiment of the present disclosure, the second plastic/polymer separated from the first solids is polyvinyl chloride (PVC) in tetrahydrofuran (THF) at 50° C.

The first solids (comprising PET, EVOH, Nylon, PVC, and PC) are taken to mixed tank reactor (Rx 2). In this step, the first solids are solubilized in the fluid medium THF (second fluid medium) under stirring at 50° C.

This step selectively dissolves PVC. At higher temperature of more than 82° C., the risk of chlorine gas evolution increases significantly. Therefore, PVC is removed at lower temperature in the range of 40° C. to 60° C.

In an embodiment of the present disclosure, the stirring is carried out at a stirring speed in the range of 200 rpm to 1000 rpm. In an exemplary embodiment of the present disclosure, the stirring speed is 400 rpm.

After continuous mixing for a time period in the range of 2 hours to 3 hours, THF selectively solubilizes PVC and remaining plastics/polymers remain in solid phase. To remove the undissolved plastics, the second crude mixture (solution) is passed through the filter to obtain a second filtrate and second solids (containing undissolved plastic material). The second filtrate is passed through activated carbon bed to remove any colored dye present in the second filtrate. The second filtrate (THF-PVC) from the activated carbon bed is then sent to a mixer 2 where isopropyl alcohol (IPA) is added as anti-solvent. This aids in removing/solidifying PVC out from the second filtrate. The solution is filtered subsequently at room temperature to remove the solid PVC from second fluid medium (THF). The fluid medium containing THF and IPA is sent to distillation column for separating both THF and water from it. After separation, both are recirculated back into the system. The solid PVC is then passed through a dryer to get a final dry solid PVC.

In an embodiment of the present disclosure, the drying of PVC is carried out by using a drying technique selected from selected from vacuum drying, using hot air and using nitrogen.

To ensure complete recovery of PVC in THF, a predetermined number of reactors are used in series in co-current and counter-current mode of operation.

In an embodiment of the present disclosure, the predetermined number of reactors is in the range of 1 to 5 reactors. In an exemplary embodiment of the present disclosure, the predetermined number of reactor is 1.

In an embodiment of the present disclosure, nitrogen is used for backflush during filtration to remove moisture and displace unwanted air or contaminants from a filtration system.

The remaining plastics/polymers (second solids) are sent to a reactor Rx-3 for further separation.

Sub-step (III): the second solids are mixed in a third fluid medium capable of solubilizing ethyl vinyl alcohol (EVOH) under stirring at a third predetermined temperature to obtain a third crude mixture followed by separating the third crude mixture to obtain a third filtrate and third solids containing undissolved plastic material; and subjecting the third filtrate to a predetermined method to obtain ethyl vinyl alcohol (EVOH) and the third fluid medium.

In an embodiment of the present disclosure, the third fluid medium is at least one selected from the group consisting of isopropyl alcohol, water, dimethyl sulfoxide (DMSO), propanediol (PDO), pyridine, diethyleneglycol, hydrogen peroxide, chloro acetic acid, dimethyl formamide (DMF), acrylic acid, N,N-dimethyl acetamide, phenol, cyclohexylamine, ethyl amine, morpholine, and N-methyl-2-pyrrolidone (NMP). In an exemplary embodiment of the present disclosure, the third fluid medium is a mixture of IPA and water (70:30).

In an embodiment of the present disclosure, the third predetermined temperature is in the range of 60° C. to 80° C. In an exemplary embodiment of the present disclosure, the third predetermined temperature is 70° C.

In an embodiment of the present disclosure, the predetermined method is selected from the group consisting of cooling, adding an antisolvent, distillation, centrifugation, skimming, and settling and filtration. In an exemplary embodiment of the present disclosure, the predetermined method is cooling.

In an embodiment of the present disclosure, the cooling is carried out at a temperature in the range of 25° C. to 30° C. In an exemplary embodiment of the present disclosure, the cooling is carried out at 27° C. (room temperature). In an embodiment of the present disclosure, the third plastic/polymer separated from the second solids is ethyl vinyl alcohol (EVOH) in IPA and water (70:30 w/w) at 70° C.

In an embodiment of the present disclosure, the second solids (comprising PET, EVOH, Nylon, and PC) are taken to mixed tank reactor (Rx 3) (FIG. 2C). In this step, the fluid medium IPA and water (70:30 w/w) at 70° C. is used and mixed under stirring for a time period in the range of 2 hours to 3 hours to selectively dissolve EVOH.

In an embodiment of the present disclosure, the stirring is carried out at a stirring speed in the range of 200 rpm to 1000 rpm. In an exemplary embodiment of the present disclosure, the stirring speed is 400 rpm.

After continuous mixing for a time period in the range of 2 hours to 3 hours, IPA and water selectively solubilizes EVOH and remaining plastics/polymers are in solid phase. To remove the undissolved plastics, the third crude mixture (solution) is passed through the filter to obtain a third filtrate and third solids (containing undissolved plastic material). The third filtrate (IPA-water-dissolved EVOH) is passed through activated carbon bed to remove any colored dye present in the third filtrate and then subsequently cooled to room temperature (25° C. to 30° C.). This aids in removing/solidifying EVOH out from the third filtrate.

The solution is filtered subsequently at room temperature to remove the solid EVOH from third fluid medium (IPA and water). The fluid medium containing IPA water solution is recirculated back into the system. The solid EVOH is then passed through a dryer to get a final dry solid EVOH.

In an embodiment of the present disclosure, the drying of EVOH is carried out by using a drying technique selected from vacuum drying, using hot air and using nitrogen.

To ensure complete recovery of EVOH in IPA water solution (70:30), a predetermined number of reactors are used in series in co-current and counter-current mode of operation.

In an embodiment of the present disclosure, the predetermined number of reactors are in the range of 1 to 5 reactors. In an exemplary embodiment of the present disclosure, the predetermined number of reactor is 1.

In an embodiment of the present disclosure, nitrogen is used for pressure filtration.

The remaining plastics/polymers (third solids) are sent to a reactor Rx-4 (FIG. 2D) for further separation.

Sub-step (IV): the third solids are mixed in a fourth fluid medium capable of solubilizing nylon under stirring at a fourth predetermined temperature to obtain a fourth crude mixture followed by separating the fourth crude mixture to obtain a fourth filtrate and fourth solids containing undissolved plastic material; and subjecting the fourth filtrate to a predetermined method to obtain nylon and the fourth fluid medium.

In an embodiment of the present disclosure, the fourth fluid medium is selected from the group consisting of formic acid, propanediol (PDO), dimethyl sulfoxide (DMSO), hydrogen peroxide, acetic acid, formic acid, chloro acetic acid, acrylic acid, benzoic acid, propionic acid, butyric acid, methacrylic acid, and isobutyric acid. In an exemplary embodiment of the present disclosure, the fourth fluid medium is formic acid.

In an embodiment of the present disclosure, formic acid has 85% concentration. In an embodiment of the present disclosure, the fourth predetermined temperature is in the range of 90° C. to 110° C. In an exemplary embodiment of the present disclosure, the fourth predetermined temperature is 100° C.

In an embodiment of the present disclosure, the predetermined method is selected from the group consisting of cooling, adding an antisolvent, distillation, centrifugation, skimming, and settling and filtration. In an exemplary embodiment of the present disclosure, the predetermined method is adding an antisolvent to the fourth filtrate.

In an embodiment of the present disclosure, the antisolvent is selected from the group consisting of water, hexane, acetone, isopropyl alcohol (IPA), methanol, and ethanol. In an exemplary embodiment of the present disclosure, the antisolvent is methanol which is added to the fourth filtrate to precipitate polymer.

In an embodiment of the present disclosure, the fourth plastic/polymer separated from the fourth solids is nylon in formic acid at 100° C.

The third solids (comprising PET, Nylon, and PC) are taken to mixed tank reactor (Rx 4). In this step, the third solids are solubilized in the fluid medium formic acid under stirring at 100° C.

In an embodiment of the present disclosure, the stirring is carried out at a stirring speed in the range of 200 rpm to 1000 rpm. In an exemplary embodiment of the present disclosure, the stirring speed is 400 rpm.

This step selectively dissolves nylon. Nylon is removed because formic acid has high selectivity towards nylon and less solubility towards other plastics/polymers.

This aids in effective separation and better recovery of nylon.

After continuous mixing for a time period in the range of 2 hours to 3 hours, formic acid selectively solubilizes nylon and remaining plastics/polymers are in solid phase. To remove the undissolved plastics, the fourth crude mixture (solution) is passed through the filter to obtain a fourth filtrate and fourth solids (containing undissolved plastic material). The fourth filtrate is passed through activated carbon bed to remove any colored dye present in the fourth filtrate. The fourth filtrate (Formic acid-nylon) from the activated carbon bed is then sent to mixer 3 where methanol is added as anti-solvent. This aids in removing/solidifying nylon out from the fourth filtrate. The solution is filtered subsequently at room temperature to remove the solid nylon from fourth fluid medium (formic acid). The fluid medium containing formic acid and methanol is sent to distillation column for separating both formic acid and methanol from it.

After separation, both (formic acid and methanol) are recirculated back into the system. The solid nylon is then passed through a dryer to get a final dry solid nylon.

In an embodiment of the present disclosure, the drying of nylon is carried out by using a drying technique selected from selected from vacuum drying, using hot air and using nitrogen.

To ensure complete recovery of nylon in formic acid, a predetermined number of reactors are used in series in co-current and counter-current mode of operation.

In an embodiment of the present disclosure, the predetermined number of reactors are in the range of 1 to 5 reactors. In an exemplary embodiment of the present disclosure, the predetermined number of reactor is 1.

In an embodiment of the present disclosure, nitrogen is used for pressure filtration.

The remaining plastics/polymers (fourth solids) are sent to a reactor Rx-5 for further separation.

Sub-step (V): the fourth solids are mixed in a fifth fluid medium capable of solubilizing polycarbonate (PC) under stirring at a fifth predetermined temperature to obtain a fifth crude mixture followed by separating the fifth crude mixture to obtain a fifth filtrate and fifth solids containing undissolved plastic material; and subjecting the fifth filtrate to a predetermined method to obtain polycarbonate (PC) and the fifth fluid medium.

In an embodiment of the present disclosure, the fifth fluid medium is selected from the group consisting of dimethyl sulfoxide (DMSO), ethyl methyl ketone (EMK), toluene, 2,3-dihydropyran, pyridine, and butanone. In an exemplary embodiment of the present disclosure, the fifth fluid medium is DMSO.

In an embodiment of the present disclosure, the fifth predetermined temperature is in the range of 110° C. to 130° C. In an exemplary embodiment of the present disclosure, the fifth predetermined temperature is 120° C.

In an embodiment of the present disclosure, the fifth plastic/polymer separated from the fourth solids is polycarbonate (PC) in dimethyl sulfoxide (DMSO) at 120° C.

In an embodiment of the present disclosure, the predetermined method is selected from the group consisting of cooling, adding an antisolvent, distillation, centrifugation, skimming, and settling and filtration. In an exemplary embodiment of the present disclosure, the predetermined method is cooling.

In an embodiment of the present disclosure, the cooling is carried out at a temperature in the range of 25° C. to 30° C. In an exemplary embodiment of the present disclosure, the cooling is carried out at 27° C. (room temperature).

The fourth solids (comprising PET and PC) are taken to mixed tank reactor (Rx 5) (FIG. 2E). In this step, the fourth solids are solubilized in the fluid medium DMSO under stirring at 120° C.

This step selectively dissolves PC. PC is removed because DMSO has high selectivity towards PC and less solubility towards other plastics/polymers. This aids in effective separation and better recovery of PC.

In an embodiment of the present disclosure, the stirring is carried out at a stirring speed in the range of 200 rpm to 1000 rpm. In an exemplary embodiment of the present disclosure, the stirring speed is 400 rpm.

After continuous mixing for a time period in the range of 2 hours to 3 hours, formic acid selectively solubilizes PC and remaining plastics/polymers are in solid phase. To remove the undissolved plastics, the fifth crude mixture (solution) is passed through the filter to obtain a fifth filtrate and fifth solids (containing undissolved plastic material). The fifth filtrate is passed through activated carbon bed to remove any colored dye present in the fifth filtrate. The fifth filtrate (DMSO-PC) from the activated carbon bed is cooled to room temperature to solidify PC.

The solution is filtered subsequently at room temperature to remove the solid PC from fifth fluid medium (DMSO). DMSO is recirculated back into the system. The solid PC is then passed through a dryer to get a final dry solid PC.

In an embodiment of the present disclosure, the drying of PC is carried out by using a drying technique selected from vacuum drying, using hot air and using nitrogen.

To ensure complete recovery of PC in DMSO, a predetermined number of reactors are used in series in co-current and counter-current mode of operation.

In an embodiment of the present disclosure, the predetermined number of reactors are in the range of 1 to 5 reactors. In an exemplary embodiment of the present disclosure, the predetermined number of reactor is 1.

In an embodiment of the present disclosure, nitrogen is used for pressure filtration.

The remaining plastics/polymers (fifth solids) are sent to a reactor Rx-6 (FIG. 2F) for further separation.

Sub-step (VI): the fifth solids are mixed in a sixth fluid medium capable of solubilizing polyethylene terephthalate (PET) under stirring at a sixth predetermined temperature to obtain a sixth crude mixture followed by separating the sixth crude mixture to obtain a sixth filtrate and sixth solids containing residual plastic material; and subjecting the sixth filtrate to a predetermined method to obtain polyethylene terephthalate (PET) and the sixth fluid medium.

In an embodiment of the present disclosure, the sixth fluid medium is selected from the group consisting of dimethyl formamide (DMF), gamma-valerolactone (GVL), dimethyl formamide, dimethyl sulfoxide (DMSO), pyridine, N, N-dimethyl acetamide, phenol, N-methyl-2-pyrrolidone (NMP), valeronitrile, trichloroacetic acid, 1-naphthol, and 1,2-dihydroxybenzene (catechol). In an exemplary embodiment of the present disclosure, the sixth fluid medium is dimethyl formamide (DMF).

In an embodiment of the present disclosure, the sixth predetermined temperature is in the range of 140° C. to 160° C. In an exemplary embodiment of the present disclosure, the sixth predetermined temperature is 150° C.

In an embodiment of the present disclosure, the predetermined method is selected from the group consisting of cooling, adding an antisolvent, distillation, centrifugation, skimming, and settling and filtration. In an exemplary embodiment of the present disclosure, the predetermined method is cooling.

In an embodiment of the present disclosure, the cooling is carried out at a temperature in the range of 25° C. to 30° C. In an exemplary embodiment of the present disclosure, the cooling is carried out at 27° C. (room temperature).

In an embodiment of the present disclosure, the sixth plastic/polymer separated from the fifth solids is polyethylene terephthalate (PET) in dimethyl formamide (DMF) at 150° C.

The fifth solids (comprising PET) are taken to mixed tank reactor (Rx 6). In this step, the fifth solids are solubilized in the fluid medium DMF under stirring at 150° C.

This step selectively dissolves PET. PET is removed because DMF has high selectivity towards PET and less solubility towards other plastics/polymers. This aids in effective separation and better recovery of PET.

In an embodiment of the present disclosure, the stirring is carried out at a stirring speed in the range of 200 rpm to 1000 rpm. In an exemplary embodiment of the present disclosure, the stirring speed is 400 rpm.

After continuous mixing for a time period in the range of 2 hours to 3 hours, formic acid selectively solubilizes PET and remaining plastics/polymers are in solid phase. To remove the undissolved plastics, the sixth crude mixture (solution) is passed through the filter to obtain a sixth filtrate and sixth solids (containing undissolved plastic material). The sixth filtrate is passed through activated carbon bed to remove any colored dye present in the sixth filtrate. The sixth filtrate (DMF-PET) from the activated carbon bed is cooled to room temperature to solidify PET. The solution is filtered subsequently at room temperature to remove the solid PET from sixth fluid medium (DMF). DMF is recirculated back into the system. The solid PET is then passed through a dryer to get a final dry solid PET.

In an embodiment of the present disclosure, the drying of PET is carried out by using a drying technique selected from vacuum drying, using hot air and using nitrogen.

The remaining plastics/polymers (sixth solids) are subjected to further treatment such as pyrolysis or recirculated back to the reactor Rx-1.

To ensure complete recovery of PET in DMF, a predetermined number of reactors are used in series in co-current and counter-current mode of operation.

In an embodiment of the present disclosure, the predetermined number of reactors are in the range of 1 to 5 reactors. In an exemplary embodiment of the present disclosure, the predetermined number of reactor is 1.

In an embodiment of the present disclosure, nitrogen is used for pressure filtration.

In a fourth step, polymers selected from polypropylene (PP), high density polyethylene (HDPE), low density polyethylene (LDPE) from the dried light plastic are sequentially separated by solubilizing the dried light plastic in a seventh fluid medium under stirring at a seventh predetermined temperature to obtain a seventh crude mixture.

FIG. 3 illustrates a schematic representation of the process for the recovery of polymers from separated light plastic, wherein polypropylene (PP), high density polyethylene (HDPE) and light density polyethylene (LDPE) are separated and recovered in accordance with the present disclosure.

In an embodiment of the present disclosure, the dried light plastic is solubilized in a seventh fluid medium to obtain a seventh crude mixture.

In an embodiment of the present disclosure, the dried light plastic waste comprises polymers selected from polypropylene (PP), high density polyethylene (HDPE), low density polyethylene (LDPE).

In an embodiment of the present disclosure, the seventh fluid medium is selected from the group consisting of o-xylene, p-xylene, mixed xylene, toluene, dodecane, camphene, 1-butanol, Tetrahydrofuran (THF), 1-octene, ethyl benzene and di-n-butyl ether. In an exemplary embodiment of the present disclosure, the seventh fluid medium is mixed xylene.

Xylene is used as a fluid medium due to its better efficiency which results in better recovery of the lighter polymers.

In an embodiment of the present disclosure, the seventh predetermined temperature is in the range of 110° C. to 130° C. In an exemplary embodiment of the present disclosure, the seventh predetermined temperature is 120° C.

The dried light plastic waste is transferred into Rx 7 (reactor) and solubilized by in Xylene under stirring at 120° C. for a time period in the range of 2 hours to 3 hours, wherein LDPE, HDPE and PP all get dissolved to obtain a seventh crude mixture. The seventh crude mixture (solution) formed is then passed through activated carbon bed to remove any color present.

The seventh crude mixture comprises lighter polymers, polypropylene (PP), high density polyethylene (HDPE), low density polyethylene (LDPE) in solubilized form.

In an embodiment of the present disclosure, the stirring is carried out at a stirring speed in the range of 200 rpm to 1000 rpm. In an exemplary embodiment of the present disclosure, the stirring speed is 400 rpm.

The sub-steps of the fourth step (separation of lighter polymers) are described in detail.

The seventh crude mixture is passed through an activated carbon bed to remove color impurities prior to cooling step.

Sub-step (I): the seventh crude mixture is cooled to a temperature in the range of 110° C. to 120° C. followed by filtering to obtain polypropylene and a seventh filtrate.

In an exemplary embodiment of the present disclosure, the seventh crude mixture is cooled to 115° C.

The polypropylene (PP) plastic/polymer becomes solid at this temperature and precipitates out of the solution. The solid PP is then filtered to obtain polypropylene and a seventh filtrate. The solid PP is sent through a vacuum dryer and dry PP is obtained.

Sub-step (II): the seventh filtrate is cooled to a temperature in the range of 90° C. to 100° C. followed by filtering to obtain high density polyethylene and an eighth filtrate.

In an exemplary embodiment of the present disclosure, the seventh filtrate is cooled to 95° C.

The seventh filtrate comprises xylene, LDPE, and HDPE.

The high density polyethylene (HDPE) plastic/polymer becomes solid at this temperature and precipitates out of the solution. The solid HDPE is then filtered to obtain HDPE and an eighth filtrate. The solid HDPE is sent through a vacuum dryer and dry HDPE is obtained.

Sub-step (III): the eighth filtrate is cooled to a temperature in the range of 75° C. to 85° C. followed by filtering to obtain low density polyethylene and the seventh fluid medium.

In an exemplary embodiment of the present disclosure, the eighth filtrate is cooled to 80° C.

The eighth filtrate comprises xylene and LDPE.

The low density polyethylene (LDPE) plastic/polymer becomes solid at this temperature and precipitates out of the solution. The solid LDPE is then filtered to obtain LDPE and xylene (the first fluid medium). The solid LDPE is sent through a vacuum dryer and dry LDPE is obtained.

The so obtained xylene (seventh fluid medium) is recycled for solubilizing the dried light plastic.

In an embodiment of the present disclosure, PP, HDPE, and LDPE are independently dried.

Drying is carried out by using a drying technique selected from vacuum dried, using hot air and using nitrogen. In an exemplary embodiment of the present disclosure, the drying is vacuum drying.

In an embodiment of the present disclosure, nitrogen is used for pressure filtration.

In an embodiment of the present disclosure, for complete recovery of PP, HDPE and LDPE, a predetermined number of reactors are used in series in co-current and counter-current mode of operator.

In an embodiment of the present disclosure, the predetermined number of reactors are in the range of 1 to 5 reactors. In an exemplary embodiment of the present disclosure, the predetermined number of reactor is 1.

In another embodiment of the present disclosure, the recovery of polymers is done by using an alternative approach. This alternative approach is based on minimum solid handling and transfer processes and present a comprehensive process which uses transfer of plastics/polymers via solvents. The transferring of liquids is much easier and reliable. The alternative process also follows the initial step of physical separation of plastic waste through the water separation process. On the basis of density, the light plastics will float and taken from the top while heavy plastics are taken from bottom. The light plastics consists of PP, LDPE, and HDPE while heavy plastics consists of PS, PVC, Nylon, EVOH, PC and PET.

FIG. 4(A) illustrates a schematic representation of alternative process for the process for the recovery of polymers wherein separated heavy plastic are taken from bottom of the water separation tank and sent to set of 12 dryer cum reactor system in equal proportions with pair of two in series and separated light plastic, wherein FIG. 4(B) represents selective solubilization and recovery of polystyrene (PS) and polyvinyl chloride (PVC), FIG. 4(C) represents selective solubilization and recovery of ethyl vinyl alcohol (EVOH), FIG. 4(D) represents selective solubilization and recovery of Nylon, FIG. 4(E) represents selective solubilization and recovery of polycarbonate (PC) and FIG. 4(F) represents selective solubilization and recovery of polyethylene terephthalate (PET) in accordance with the present disclosure.

In an embodiment of the present disclosure, the polymer is at least one selected from polystyrene (PS), polyvinyl chloride (PVC), ethyl vinyl alcohol (EVOH), nylon, polycarbonate (PC) and polyethylene terephthalate (PET) which are simultaneously separated from the heavy plastic, using the alternative approach.

The alternative approach for the parallel and simultaneous recovery/separation of polymers comprises the following steps:

A. transferring equal proportions of the heavy plastic from the bottom of the water separation tank to a predetermined number of a reactor system with pair of two in parallel comprising a reactor system for drying and a reactor system for solubilization of the heavy plastic and drying the heavy plastic in the drying stage of the $1^{st}$ set of dryer cum reactor system;

B. mixing the dried plastic waste in a first fluid medium capable of solubilizing polystyrene under first predetermined conditions to obtain a first filtrate and first solids containing undissolved plastic material followed by separating polystyrene from the first filtrate to obtain polystyrene and the first fluid medium;

C. adding the first fluid medium after the separation of polystyrene obtained in step B to a $2^{nd}$ set of dryer cum reactor system and further to the predetermined number of reactor system to obtain polystyrene and the first fluid medium;

D. repeating the step C for a predetermined number of times with respect to the predetermined number of the reactor system; and E. repeating steps B, C, and D using a second fluid medium to a sixth fluid medium in the dryer cum reactor system in series under second predetermined conditions to sixth predetermined conditions to recover the respective polymers.

In accordance with the present disclosure, the first predetermined conditions to sixth predetermined conditions include predetermined temperature, predetermined time period and predetermined stirring speed.

Other process conditions are similar as provided hereinabove in the first embodiment of the present disclosure.

The light plastics are taken from top and sent to a dryer cum reactor system. It is a set of two dryer cum reactor system. At an instant, one of the vessel dries the solid after receiving the wet light plastic from the plastic separation tank and other one acts as a reactor and mixing the fluid medium xylene at 120° C. for a time period in the range of 2 hours to 3 hours. After the mixing process, all the light plastic get dissolved in xylene. The crude mixture (solution) formed is then passed through activated carbon bed to remove any color present. The crude mixture (solution) from tank at 120° C. is then passed through a heat exchanger where the solution is cooled up to 115° C. The PP plastic becomes solid and comes out of the solution. Then the solution is passed through a filter which removes the solid PP from the solution. The PP solid is sent through a dryer and finally dry PP is obtained. Further, the solution containing xylene, LDPE, HDPE is passed through next heat exchanger to cool it down to 95° C. At this temperature, the HDPE solidifies and comes out of the solution. The solution is passed through a filter where solid HDPE is removed. The solid HDPE is sent to a dryer to obtain the dry HDPE as a product. The solution containing dissolved LDPE is separated by cooling the xylene further up to 80° C. The solution is passed through a filter and the removed LDPE is then sent to a dryer to get final LDPE as a product.

The recovered xylene is circulated back to system.

The heavy plastics are taken from bottom of the water separation tank and sent to set of 12 dryer cum reactor system in equal proportions with pair of two in series. One system is at drying stage and another receives the fluid medium for solubilization of heavy plastic. At an instant, one of the vessel dries the solid after receiving the wet heavy plastic from the plastic separation tank and other one acts as a reactor and mixes the solvent. During start of the process, after drying the fluid medium is mixed with the heavy plastic in a first set of dryer cum reactor setup. In this process, the fluid medium EMK at 40° C. is used to selectively dissolve PS. After 2 hours to 3 hours of solubilizing time, the PS is dissolved in EMK and remaining plastics/polymers are in solid phase. Separation process of PS from EMK is same as the process stated above. Now, after the removal of PS from the mixed plastic waste, next fluid medium THF is added in the same first dryer cum reactor setup to dissolve PVC and follows the same process for dissolving PVC and post treatment for getting dry PVC. Meanwhile, EMK is sent to a second dryer cum reactor setup to dissolve PS and is subjected to same process as stated above. After removal of PVC in the first dryer cum reactor step, Formic acid is used to remove Nylon/EVOH from plastic waste. Similarly, after completion of PS dissolution in the second dryer cum reactor setup, THF will be transferred to remove the PVC and in third dryer cum reactor setup EMK is added to remove the PS.

This process is continued till sixth dryer cum reactor setup. At any instant of time, one of the solvents is transferred to the dryer cum reactor setup for selective solubilization of plastics.

The complete process follows total of six number of sequences as shown in table 1:

TABLE 1

| Process sequence of given reactor setup | |
| --- | --- |
| Step 1 | Selective solubilization of PS |
| Step 2 | Selective solubilization of PVC |
| Step 3 | Selective solubilization of EVOH |

TABLE 1-continued

| Process sequence of given reactor setup | |
| --- | --- |
| Step 4 | Selective solubilization of Nylon |
| Step 5 | Selective solubilization of PC |
| Step 6 | Selective solubilization of PET |

At any given time, the dryer cum reactor setup is at one of the above tabulated steps and selectively solubilizing one of the plastics. After attaining steady state, the 6 parallel dryer cum reactor systems are sequentially at different steps among steps 1 through 6 tabulated above and this makes the complete operation as continuous steady state process. Also, each dryer cum reactor setup undergoes processing steps from 1 to 6 sequentially. A given dryer cum reactor after the completion of step 6 receives the fresh heavy plastic from the earlier physical separation step, dries the wet plastic waste, and goes back to the processing step 1 thereby resuming the processing sequence again.

The merit of this process is that it involves minimal solid transfer from one reactor setup to another. The process of the present disclosure remains unaffected even if one or more types of plastics are missing from the plastic waste. Rather, multiple liquid solvents are being circulated to solubilize the plastic material held up in a single dryer cum reactor setup which makes this process relatively more reliable and maintenance friendly.

The process of the present disclosure recovers/separates lighter polymers including polypropylene (PP), high density polyethylene (HDPE) and light density polyethylene (LDPE) and heavy polymers including polystyrene (PS, polyvinyl chloride (PVC), ethyl vinyl alcohol (EVOH), nylon, polycarbonate (PC) and polyethylene terephthalate (PET) by selective solubilization.

The separated/recovered plastic/polymers can be chemically depolymerized to its respective monomers, upcycled to another suitable applications or subject to pyrolysis for synthetic hydrocarbon liquid generation.

The process of the present disclosure is simple, economical, and environment-friendly.

In accordance with the present disclosure, the polymer or the plastic waste undergo selective solubilization in various fluid medium (solvent) to separate a specific polymer. Further, the solubilization of these plastic waste is generally carried out at a temperature below the boiling point of the fluid medium/solvent.

Moreover, the solubilization temperature is chosen in such a way that the solubilization temperature should be lower than the melting point of the polymer material.

The importance of 'selective solubilization' in the context of polymer recovery from plastic waste is evident when compared to conventional mechanical recycling methods. Conventional mechanical recycling, which involves physical processes like shredding, melting, and reforming plastic waste, is often ineffective in producing high-quality polymers. This is because it typically results in the degradation of polymer chains, contamination with impurities, and limited ability to handle mixed plastic waste. As a result, the quality of recycled polymers is reduced, limiting their potential for reuse in high-end applications.

One of the main challenges of conventional methods is the indiscriminate use of random solvents or simple mechanical techniques to recover polymers from the waste. These methods do not consider the specific chemical properties of different polymers, leading to the recovery of low-quality polymers. When solvents are not tailored to selectively interact with specific polymers, the recovery process results in a mix of polymers, additives, and contaminants, which cannot be efficiently separated or purified. This lowers the overall value and performance of the recovered material, making it unsuitable for many industrial or commercial applications.

In contrast, the process described in the present disclosure relies on the principle of selective solubilization, where specific fluid media are used to target and dissolve particular polymers based on their unique solubility properties. Each polymer in the waste stream requires a specific solvent or fluid medium to solubilize it effectively without affecting the others. Once a polymer is solubilized, it can be selectively precipitated out by introducing an antisolvent, or cooling to a particular temperature, leading to the recovery of high-purity polymers. This approach ensures that only the targeted polymer is dissolved, while others remain intact and can be processed separately.

The selective solubilization process offers several advantages over conventional methods:

Higher Purity of Recovered Polymers: By using targeted solvents, each polymer is recovered in its purest form, which enhances the quality of the final product and makes it suitable for reuse in high-value applications.

Better Separation of Mixed Plastics: Mixed plastic waste can be effectively separated into its constituent polymers without contamination, ensuring that each polymer type is isolated and recovered separately, unlike conventional methods that typically yield a mixture of degraded materials.

In accordance with the present disclosure, the dissolved plastic or dissolved polymer can be separated by a method selected from cooling the mixture containing dissolved polymer to obtain solids of polymer;

adding an antisolvent to the mixture containing dissolved polymer to precipitate the polymer;

distillation can be carried out to obtain solids of the polymer;

centrifugation to obtain solids of the polymer;

skimming to obtain solids of the polymer; and settling and filtration to obtain solids of the polymer.

Minimizing Polymer Degradation: Since selective solubilization involves dissolving polymers without excessive heat or mechanical stress, it minimizes the risk of polymer degradation, which is common in conventional mechanical recycling processes.

Increased Efficiency: Selective solubilization reduces the need for complex, energy-intensive mechanical processes, as the polymer separation is achieved through chemical means, leading to a more energy-efficient recovery process.

Overall, selective solubilization offers a more sophisticated and effective approach to polymer recovery, addressing the limitations of conventional mechanical recycling by ensuring higher-quality, more valuable, and purer recovered polymers that can be reused in diverse applications. This makes the process of the present disclosure particularly important for handling complex, mixed plastic waste that conventional methods often fail to process effectively.

The foregoing description of the embodiments has been provided for purposes of illustration and not intended to limit the scope of the present disclosure. Individual components of a particular embodiment are generally not limited to that particular embodiment, but are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

Experimental Details

Experiment 1: A Process for the Recovery of Polymers from Plastic Waste in Accordance with the Present Disclosure A. Shredding and water separation step for plastic waste The mixed plastic waste stream containing PET, PP, PE, EVOH, PS, Nylon, PC, and PVC was subjected to shredding in a shredder. The plastic waste comprising polymer mixture was shredded to obtain a shredded plastic waste having particle size 1 mm to 10 mm.

The so obtained shredded plastic waste was mixed with water to separate out a top layer of lighter plastic waste and a bottom layer of heavy plastic. The water separation step separated the mixed plastic waste based on their density.

PP and PE floated since they were lighter than water, while the heavy plastics settled down. This resulted in the formation of two separate layers after sufficient residence time. The top layer, consisting of PP and PE, was taken out from the top and sent to a dryer. After drying step, the light plastic waste was taken through a conveyor belt for further processing.

The heavy plastic that was settled down at the bottom, was also taken out and sent to a separate dryer. After the drying step, the heavy plastic was taken for further processing.

The dried light and dried heavy plastic were transferred to the reactors via any of the routes such as gravity flow, pneumatic conveying, or mechanical conveying, such as screw conveyors, belt conveyors, or bucket conveyors. The process scheme is depicted in FIG. 1.

B. a Process for the Recovery of Polymers from Heavy Plastic (PS, PVC, Nylon, EVOH, PC and PET) by Selective Solubilization in Accordance with the Present Disclosure a. The dried heavy plastics (PS, PVC, Nylon, EVOH, PC and PET) was taken through the conveyor and sent to the first mixed tank reactor Rx-1. The dried heavy plastic was selectively mixed in ethyl methyl ketone (EMK) (first fluid medium) at 400 rpm at 40° C. for 2 hours to obtain a first crude mixture comprising a solubilized polymer and an insolubilized polymer mixture.

After 2 hours of solubilizing time, the PS was dissolved in EMK and remaining undissolved plastic material was in solid phase. The solution was passed through the filter to remove the undissolved plastic material (first solids). To remove the undissolved plastics, the first crude mixture (solution) was passed through the filter to obtain a first filtrate and first solids (containing undissolved plastic material). The first filtrate was passed through activated carbon bed to remove any colored dye present in the first filtrate. The first filtrate from the activated carbon bed was then sent to mixer 1 where water was added as anti-solvent. This aided in removing the PS out from the first filtrate. The solution was filtered subsequently at room temperature to remove the solid PS from first fluid medium (EMK). The fluid medium containing EMK and water was sent to distillation column for separating both EMK and water from it. After separation, both were recirculated back into the system. The solid PS was then passed through a vacuum dryer to get final dry solid PS.

The remaining plastics/polymers (first solids) were sent to a reactor Rx-2 for further separation.

b. In the next step, the first solids were taken to Rx 2. The fluid medium Tetrahydrofuran (THF) (second fluid medium) was added to the first solids at 50° C. After continuous stirring at 400 rpm for 2 hours, THF selectively solubilized the polyvinyl chloride (PVC) while rest of the plastics were in solid form. To remove the undissolved plastics, the second crude mixture (solution) was passed through a filter to obtain a second filtrate and second solids (containing undissolved plastic material). The second filtrate was passed through activated carbon bed to remove any colored dye present in the second filtrate. The second filtrate (THF-PVC) from the activated carbon bed was then sent to mixer 2 where isopropyl alcohol (IPA) was added as anti-solvent. This aided in removing/solidifying PVC out from the second filtrate. The solution was filtered subsequently at room temperature to remove the solid PVC from second fluid medium (THF). The fluid medium containing THF and IPA was sent to distillation column for separating both THF and water from it. After separation, both were recirculated back into the system. The solid PVC was then passed through a vacuum dryer to get final dry solid PVC.

The remaining plastics/polymers (second solids) were sent to a reactor Rx-3 for further separation.

c. The second solids (comprising PET, EVOH, Nylon, and PC) were taken to mixed tank reactor (Rx 3). In this step, the fluid medium IPA and water (third fluid medium) (70:30 w/w) at 70° C. was used and mixed for 2 hours to selectively dissolve EVOH.

After continuous mixing for 2 hours, IPA and water selectively solubilized EVOH and remaining plastics/polymers were in solid phase. To remove the undissolved plastics, the third crude mixture (solution) was passed through the filter to obtain a third filtrate and third solids (containing undissolved plastic material). The third filtrate (IPA-water-dissolved EVOH) was passed through activated carbon bed to remove any colored dye present in the third filtrate and then subsequently cooled to room temperature. This helped in removing/solidifying EVOH out from the third filtrate. The solution was filtered subsequently at room temperature to remove the solid EVOH from third fluid medium (IPA and water). The fluid medium containing IPA water solution was recirculated back into the system. The solid EVOH was then passed through a dryer to get final dry solid EVOH.

The remaining plastics/polymers (third solids) are sent to a reactor Rx-4 for further separation.

d. The third solids (comprising PET, Nylon, and PC) were taken to mixed tank reactor (Rx 4). In this step, the fluid medium formic acid (fourth fluid medium) at 100° C. was used to selectively dissolve nylon. Nylon was removed because formic acid has high selectivity towards nylon and less solubility towards other plastics/polymers. This helped in effective separation and better recovery of nylon.

After continuous mixing for 2 hours, formic acid selectively solubilized nylon and remaining plastics/polymers were in solid phase. To remove the undissolved plastics, the fourth crude mixture (solution) was passed through the filter to obtain a fourth filtrate and fourth solids (containing undissolved plastic material). The fourth filtrate was passed through activated carbon bed to remove any colored dye present in the fourth filtrate. The fourth filtrate (Formic acid-nylon) from the activated carbon bed was then sent to mixer 3 where methanol was added as anti-solvent. This aids in removing/solidifying nylon out from the fourth filtrate. The solution was filtered subsequently at room temperature to remove the solid nylon from fourth fluid medium (formic acid). The fluid medium containing formic acid and methanol was sent to distillation column for separating both formic acid and methanol from it. After separation, both (formic acid and methanol) were recirculated back into the system. The solid nylon was then passed through a dryer to get final dry solid nylon.

The remaining plastics/polymers (fourth solids) were sent to a reactor Rx-5 for further separation.

e. The fourth solids (comprising PET and PC) were taken to mixed tank reactor (Rx 5). In this step, the fluid medium DMSO (fifth fluid medium) at 120° C. was used to selectively dissolve PC. PC was removed because DMSO has high selectivity towards PC and less solubility towards other plastics/polymers. This aided in effective separation and better recovery of PC.

After continuous mixing for 2 hours, formic acid selectively solubilized PC and remaining plastics/polymers are in solid phase. To remove the undissolved plastics, the fifth crude mixture (solution) is passed through the filter to obtain a fifth filtrate and fifth solids (containing undissolved plastic material). The fifth filtrate is passed through activated carbon bed to remove any colored dye present in the fifth filtrate. The fifth filtrate (DMSO-PC) from the activated carbon bed was cooled to room temperature to solidify PC. The solution was filtered subsequently at room temperature to remove the solid PC from fifth fluid medium (DMSO). DMSO was recirculated back into the system. The solid PC was then passed through a dryer to get final dry solid PC.

The remaining plastics/polymers (fifth solids) were sent to a reactor Rx-6 for further separation.

f. In the final step, the fifth solids (comprising PET) were taken to mixed tank reactor (Rx 6). In this step, the fluid medium DMF (sixth fluid medium) at 150° C. was used to selectively dissolve PET. PET was removed because DMF has high selectivity towards PET and less solubility towards other plastics/polymers. This helped in effective separation and better recovery of PET.

After continuous mixing for 2 hours, DMF selectively solubilized PET and remaining plastics/polymers were in solid phase. To remove the undissolved plastics, the sixth crude mixture (solution) was passed through the filter to obtain a sixth filtrate and sixth solids (containing undissolved plastic material). The sixth filtrate was passed through activated carbon bed to remove any colored dye present in the sixth filtrate. The sixth filtrate (DMF-PET) from the activated carbon bed was cooled to room temperature to solidify PET. The solution was filtered subsequently at room temperature to remove the solid PET from sixth fluid medium (DMF). DMF was recirculated back into the system. The solid PET was then passed through a dryer to get final dry solid PET.

To ensure complete recovery of the plastic in the solvent, predetermined number of reactors were used in series in co-current and counter-current mode of operation for recovery of each polymer.

C. a Process for the Recovery of Polymers from Lighter Plastics (LDPE, HDPE, PP) in Accordance with the Present Disclosure The lighter plastic waste (LDPE, HDPE, and PP) was treated by selective solubilization/dissolution and stepwise cooling technique in a solvent. Xylene was used as a fluid medium because of its better efficiency which resulted in better recovery.

The lighter plastic waste was transferred into Rx 7 where xylene was added at 120° C. and stirred at 400 rpm for 2 hours, wherein LDPE, HDPE and PP all were dissolved (seventh crude mixture). The seventh crude mixture (solution) formed was then passed through activated carbon bed to remove any color present.

The seventh crude mixture from the activated carbon bed was then passed through a heat exchanger where the seventh crude mixture (solution) was cooled up to 115° C. The polypropylene (PP) plastic/polymer became solid at this temperature and precipitated out of the solution. The solid PP was then filtered to obtain polypropylene and a seventh filtrate (HDPE-LDPE-xylene). The solid PP was sent through a vacuum dryer and dry PP was obtained.

The seventh filtrate was then passed through a heat exchanger where the seventh filtrate was cooled up to 95° C. The high density polyethylene (HDPE) plastic/polymer becomes solid at this temperature and precipitated out of the solution. The solid HDPE was then filtered to obtain HDPE and an eighth filtrate (xylene-LDPE). The solid HDPE was sent through a vacuum dryer and dry HDPE was obtained.

The eighth filtrate was then passed through a heat exchanger where the eighth filtrate was cooled up to 80° C. The low density polyethylene (LDPE) plastic/polymer becomes solid at this temperature and precipitated out of the solution. The solid LDPE was then filtered to obtain LDPE and xylene (the seventh fluid medium). The solid LDPE was sent through a vacuum dryer and dry LDPE was obtained.

The so obtained xylene (seventh fluid medium) was recycled for solubilizing the dried light plastic.

To ensure complete recovery of the plastic in the solvent, predetermined number of reactors was used in series in co-current and counter-current mode of operation.

Technical Advancements

The present disclosure described herein above has several technical advantages including, but not limited to, the realization of a process for the recovery of polymers from plastic waste, that:

is simple;
is easily scalable;
is energy saving;
has high separation efficiency for polymers;
is economic; and
is environment-friendly.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveals the general nature of the embodiments herein that others can, by applying current knowledge, readily modify and/or adapt for various applications of such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for the recovery of polymers from mixed plastic waste, said process comprising the following steps:
   a) shredding mixed plastic waste to a predetermined particle size followed by mixing with water and separating a floating top layer of light material containing light plastic and a settled bottom layer of heavy material containing heavy plastic;
   b) separately drying said light material containing light plastic and said heavy material containing heavy plastic in a dryer to obtain a dried light plastic and a dried heavy plastic;
   c) sequentially separating polymers selected from polystyrene (PS), polyvinyl chloride (PVC), ethyl vinyl alcohol (EVOH), nylon, polycarbonate (PC) and polyethylene terephthalate (PET) from said dried heavy plastic by:
      I. mixing said dried heavy plastic in a first fluid medium capable of solubilizing polystyrene under stirring at a first predetermined temperature to obtain a first crude mixture followed by separating said first crude mixture to obtain a first filtrate and first solids containing undissolved plastic material; and subjecting said first filtrate to a predetermined method to obtain polystyrene and said first fluid medium, wherein said first predetermined temperature is in the range of 30° C. to 50° C.;

II. mixing said first solids in a second fluid medium capable of solubilizing polyvinyl chloride under stirring at a second predetermined temperature to obtain a second crude mixture followed by separating said second crude mixture to obtain a second filtrate and second solids containing undissolved plastic material; and subjecting said second filtrate to a predetermined method to obtain polyvinyl chloride and said second fluid medium, wherein said second predetermined temperature is in the range of 40° C. to 60° C.;

III. mixing said second solids in a third fluid medium capable of solubilizing ethyl vinyl alcohol (EVOH) under stirring at a third predetermined temperature to obtain a third crude mixture followed by separating said third crude mixture to obtain a third filtrate and third solids containing undissolved plastic material; and subjecting said third filtrate to a predetermined method to obtain ethyl vinyl alcohol (EVOH) and said third fluid medium, wherein said third predetermined temperature is in the range of 60° C. to 80° C.;

IV. mixing said third solids in a fourth fluid medium capable of solubilizing nylon under stirring at a fourth predetermined temperature to obtain a fourth crude mixture followed by separating said fourth crude mixture to obtain a fourth filtrate and fourth solids containing undissolved plastic material; and subjecting said fourth filtrate to a predetermined method to obtain nylon and said fourth fluid medium, wherein said fourth predetermined temperature is in the range of 90° C. to 110° C.;

V. mixing said fourth solids in a fifth fluid medium capable of solubilizing polycarbonate (PC) under stirring at a fifth predetermined temperature to obtain a fifth crude mixture followed by separating said fifth crude mixture to obtain a fifth filtrate and fifth solids containing undissolved plastic material; and subjecting said fifth filtrate to a predetermined method to obtain polycarbonate (PC) and said fifth fluid medium, wherein said fifth predetermined temperature is in the range of 110° C. to 130° C.; and VI. mixing said fifth solids in a sixth fluid medium capable of solubilizing polyethylene terephthalate (PET) under stirring at a sixth predetermined temperature to obtain a sixth crude mixture followed by separating said sixth crude mixture to obtain a sixth filtrate and sixth solids containing residual plastic material; and subjecting said sixth filtrate to a predetermined method to obtain polyethylene terephthalate (PET) and said sixth fluid medium, wherein said sixth predetermined temperature is in the range of 140° C. to 160° C.; and d) sequentially separating polymers selected from polypropylene (PP), high density polyethylene (HDPE), low density polyethylene (LDPE) from said dried light plastic by solubilizing said dried light plastic in a seventh fluid medium under stirring at a seventh predetermined temperature to obtain a seventh crude mixture, wherein said seventh predetermined temperature is in the range of 110° C. to 130° C. followed by:

I. cooling said seventh crude mixture to a temperature in the range of 110° C. to 120° C. followed by filtering to obtain polypropylene and a seventh filtrate;

II. cooling said seventh filtrate to a temperature in the range of 90° C. to 100° C. followed by filtering to obtain high density polyethylene and an eighth filtrate; and III. cooling said eighth filtrate to a temperature in the range of 75° C. to 85° C. followed by filtering to obtain low density polyethylene and said seventh fluid medium; and wherein said predetermined method is selected from the group consisting of cooling, adding an antisolvent, distillation, centrifugation, skimming, and settling and filtration.

2. The process as claimed in claim 1, wherein polypropylene, high density polyethylene, low density polyethylene, polystyrene (PS), polyvinyl chloride (PVC), ethyl vinyl alcohol (EVOH), nylon, polycarbonate (PC) and polyethylene terephthalate (PET) are independently dried.

3. The process as claimed in claim 1, wherein said first crude mixture, said second crude mixture, said third crude mixture, said fourth crude mixture, said fifth crude mixture, said sixth crude mixture and said seventh crude mixture are independently passed in an activated carbon bed to remove color impurities.

4. The process as claimed in claim 1, wherein said first fluid medium, said second fluid medium, said third fluid medium, said fourth fluid medium, said fifth fluid medium and said sixth fluid medium are independently recycled for solubilizing said dried heavy plastic, said first solids, said second solids, said third solids, said fourth solids, and said fifth solids, respectively.

5. The process as claimed in claim 1, wherein said seventh fluid medium is recycled to step d) for solubilizing said dried light plastic.

6. The process as claimed in claim 1, wherein said cooling is carried out at a temperature in the range of 25° C. to 30° C.

7. The process as claimed in claim 1, wherein said predetermined particle size is in the range of 0.1 mm to 10 mm.

8. The process as claimed in claim 1, wherein said first fluid medium is selected from the group consisting of ethyl methyl ketone (EMK), tetrahydrofuran (THF), toluene, xylene, N-methyl-2-pyrrolidone (NMP), valeronitrile, trichloroacetic acid, 1-Naphthol, 1,2-dihydroxybenzene (Catechol), dimethyl formamide (DMF), N,N-dimethyl acetamide, cyclohexanone, N-methyl-2-pyrrolidone (NMP), cyclopentanone, and mesityl oxide;

said second fluid medium is selected from the group consisting of THF, toluene, 2,3-dihydropyran, pyridine, chlorobenzene, ethyl acetoacetate, diethyleneglycol, propylene carbonate, 1-butanol, dimethyl formamide (DMF), N,N-dimethyl acetamide, cyclohexanone, morpholine, N-methyl-2-pyrrolidone (NMP), valeronitrile, cyclopentanone, and dimethyl sulfoxide (DMSO);

said third fluid medium is at least one selected from the group consisting of isopropyl alcohol (IPA), water, dimethyl sulfoxide (DMSO), propanediol (PDO), pyridine, diethyleneglycol, hydrogen peroxide, chloro acetic acid, dimethyl formamide (DMF), acrylic acid, N,N-dimethyl acetamide, phenol, cyclohexylamine, ethyl amine, morpholine, and N-Methyl-2-pyrrolidone (NMP);

said fourth fluid medium is selected from the group consisting of formic acid, propanediol (PDO), dimethyl sulfoxide (DMSO), hydrogen peroxide, acetic acid, formic acid, chloro acetic acid, acrylic acid, benzoic acid, propionic acid, butyric acid, methacrylic acid, and isobutyric acid;

said fifth fluid medium is selected from the group consisting of dimethyl sulfoxide (DMSO), ethyl methyl ketone (EMK), toluene, 2,3-dihydropyran, pyridine, and butanone;

said sixth fluid medium is selected from the group consisting of dimethyl formamide (DMF), gamma-valerolactone (GVL), dimethyl formamide, dimethyl sulfoxide (DMSO), pyridine, N,N-dimethyl acetamide, phenol, N-Methyl-2-pyrrolidone (NMP), valeronitrile, trichloroacetic acid, 1-Naphthol, and 1,2-dihydroxybenzene (Catechol); and said seventh fluid medium is selected from the group consisting of o-xylene, p-xylene, mixed xylene, toluene, dodecane, camphene, 1-butanol, tetrahydrofuran (THF), 1-octene, ethyl benzene and di-n-butyl ether.

9. The process as claimed in claim 1, wherein said antisolvent is selected from the group consisting of water, hexane, acetone, isopropyl alcohol (IPA), methanol, and ethanol.

10. The process as claimed in claim 1, wherein said step (c) comprises parallel and simultaneous separation of polymers selected from polystyrene (PS), polyvinyl chloride (PVC), ethyl vinyl alcohol (EVOH), nylon, polycarbonate (PC) and polyethylene terephthalate (PET) from said dried heavy plastic.

\* \* \* \* \*